US008837929B2

(12) United States Patent
Nomura et al.

(10) Patent No.: US 8,837,929 B2
(45) Date of Patent: Sep. 16, 2014

(54) IMAGING APPARATUS

(71) Applicant: Hoya Corporation, Tokyo (JP)

(72) Inventors: Hiroshi Nomura, Saitama (JP); Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 14/032,775

(22) Filed: Sep. 20, 2013

(65) Prior Publication Data
US 2014/0086568 A1 Mar. 27, 2014

(30) Foreign Application Priority Data
Sep. 25, 2012 (JP) ................................ 2012-210276

(51) Int. Cl.
*G03B 17/00* (2006.01)
*H04N 5/228* (2006.01)
*G02B 27/64* (2006.01)

(52) U.S. Cl.
CPC .................... *G02B 27/646* (2013.01)
USPC ........................ 396/55; 348/208.11

(58) Field of Classification Search
CPC .................. H04N 5/23287; G03B 2205/0007
USPC ...................... 396/55; 248/208.7, 208.11
See application file for complete search history.

(56) References Cited

U.S. PATENT DOCUMENTS

| 5,040,881 A * | 8/1991 | Tsuji .............................. 359/557 |
| 2006/0066956 A1 * | 3/2006 | Arai ............................... 359/689 |
| 2006/0127073 A1 | 6/2006 | Yasuda |
| 2006/0268431 A1 | 11/2006 | Jin |
| 2007/0297781 A1 * | 12/2007 | Kitano ............................ 396/55 |
| 2008/0232789 A1 * | 9/2008 | Otsuka ........................... 396/55 |
| 2008/0266404 A1 | 10/2008 | Sato |
| 2011/0181740 A1 | 7/2011 | Watanabe et al. |

FOREIGN PATENT DOCUMENTS

| JP | 2006-166202 | 6/2006 |
| JP | 2006-259247 | 9/2006 |
| JP | 2006-330439 | 12/2006 |
| JP | 2007-228005 | 9/2007 |
| JP | 2008-268700 | 11/2008 |
| JP | 2009-086319 | 4/2009 |

(Continued)

OTHER PUBLICATIONS

U.S. Appl. No. 14/032,792 to Hiroshi Nomura et al., which was filed on Sep. 20, 2013.

(Continued)

*Primary Examiner* — Clayton E Laballe
*Assistant Examiner* — Noam Reisner
(74) *Attorney, Agent, or Firm* — Greenblum & Bernstein, P.L.C.

(57) ABSTRACT

An imaging apparatus includes a front lens group including a front lens element and a prism, a prism holder which supports the prism, a movable frame which supports the front lens element and is supported by the prism holder to be movable along a plane orthogonal to the optical axis, and a driver which drives the movable frame to reduce image shake. The driver includes a permanent magnet and a coil positioned in a magnetic field of the permanent magnet, wherein one of the permanent magnet and the coil is a movable element which is fixed to the movable frame to move with the movable frame, the other of the permanent magnet and the coil is a fixed element, which does not move with the movable frame, and a position of the fixed element is determined by the prism holder.

21 Claims, 21 Drawing Sheets

(56) References Cited

FOREIGN PATENT DOCUMENTS

| JP | 2010-128384 | 6/2010 |
| JP | 2010-204341 | 9/2010 |
| JP | 4717529 | 4/2011 |
| JP | 4789655 | 7/2011 |

OTHER PUBLICATIONS

U.S. Appl. No. 13/859,916 to Hiroshi Nomura et al., which was filed on Apr. 10, 2013.

* cited by examiner

Fig.7
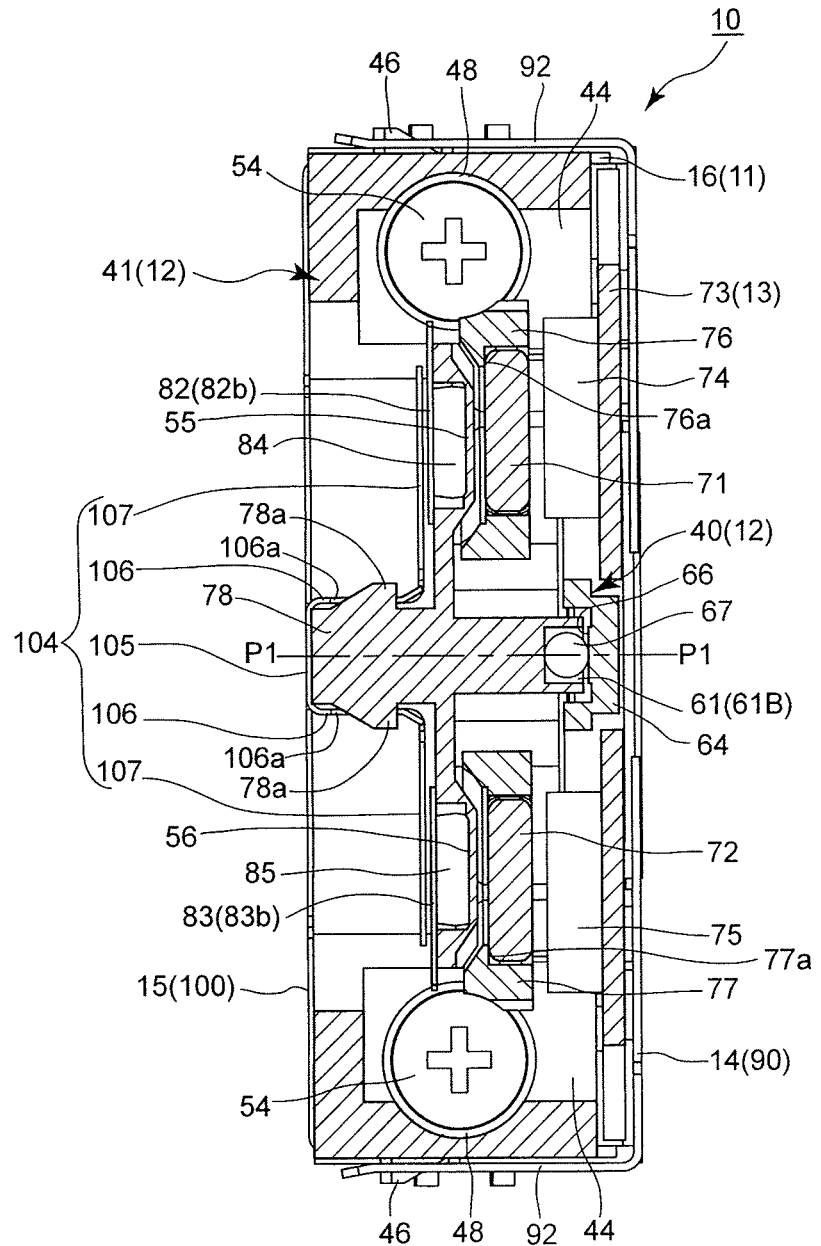
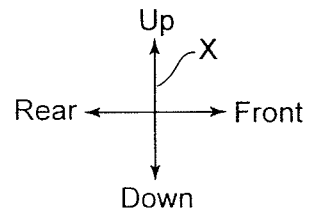

IMAGING APPARATUS

BACKGROUND OF THE INVENTION

1. Field of the Invention

The present invention relates to an imaging apparatus equipped with an anti-shake (image shake correction/image stabilizing/shake reduction) system.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and personal digital assistants (PDAs) equipped with a camera, have become widespread. In these types of mobile electronic devices, it is common to provide the mobile electronic device therein with an imaging unit (imaging apparatus) which is configured so that an image sensor (image pickup device) and an imaging optical system, for guiding light emanating from a photographic object (object-emanated light) to the image sensor, are accommodated in a hollow housing of the imaging unit. Additionally, in recent years, the demand to slim down this type of imaging unit has become stronger due to further progress in the slimming down of mobile electronic devices. In order to slim down an imaging unit, it is known to provide an imaging unit with a bending optical system which reflects (bends) light rays using a reflecting surface of a reflector such as a prism or a mirror.

In addition, there tends to be a demand for imaging units to be equipped with a so-called anti-shake (image shake correction) system that is designed to reduce image shake on an image plane that is caused by vibrations such as hand shake. The following four different types of imaging units are known in the art as imaging units using a bending optical system which are equipped with an anti-shake system: a first type (disclosed in Japanese Unexamined Patent Publication Nos. 2009-86319 and 2008-268700) in which an image sensor is moved in directions orthogonal to an image plane to reduce image shake, a second type (disclosed in Japanese Unexamined Patent Publication No. 2010-128384 and Japanese Patent No. 4,789,655) in which a lens disposed behind a reflector (on the image plane side) that has a reflecting surface is moved in directions orthogonal to an optical axis to reduce image shake, a third type (disclosed in Japanese Unexamined Patent Publication Nos. 2007-228005, 2010-204341, 2006-330439, and Japanese Patent No. 4,717,529) in which the angle of a reflector (a reflecting surface thereof) and the angle of a lens adjacent to the reflector are changed to reduce image shake, and a fourth type (disclosed in Japanese Unexamined Patent Publication Nos. 2006-166202 and 2006-259247) in which an entire imaging unit is tilted/inclined to reduce image shake.

An anti-shake system using voice coil motors (VCMs), which generate force (driving force) by application of a current (voltage) across the terminals of the coil positioned inside the magnetic field of a permanent magnet, for driving an optical element (anti-shake optical element) to reduce image shake is known in the art (disclosed in in Japanese Unexamined Patent Publication Nos. 2009-86319, 2010-128384, 2007-228005, and Japanese Patent No. 4,789,655). Information on the position of the anti-shake optical element can be obtained with sensors (Hall sensors) that measure the change in the magnetic field.

The first type of anti-shake system tends to become complicated in structure and tends to increase in cost because a circuit board connected to the image sensor is moved so as to follow movements of the image sensor, which requires electrical components around the image sensor also to be movable components in addition to the image sensor. In addition, the periphery of the imaging surface of the image sensor is required to be dust tight; however, in small imaging units intended for being incorporated into a mobile phone or a personal digital assistant, it is difficult to secure sufficient space for allowing the image sensor to perform an anti-shake (image shake correction/image-stabilizing/shake reduction) operation while maintaining the dust-tight structure of the image sensor.

The second type of anti-shake system has a structure such that the moving direction of the lens group, disposed behind the reflector, during an anti-shake operation corresponds to the direction of the thickness of the imaging unit (i.e., the forward/rearward direction of the imaging unit, wherein the direction toward an object to be photographed refers to the forward (front) direction of the imaging unit), and hence, there is a problem with providing enough space to house such an anti-shake structure in a slimmed-down imaging unit. In other words, the slimming of the imaging unit is limited if this type of anti-shake system is used. There is a similar problem also in the type of anti-shake system in which an image sensor is moved, instead of a lens group, in the direction of the thickness of the imaging unit.

The third type of anti-shake system requires a large space for allowing the reflector and the lens group to tilt/incline, and accordingly, the imaging unit is easily enlarged in size. The fourth type of anti-shake system requires a larger space for allowing the entire imaging unit to be tilted/inclined to reduce image shake.

Accordingly, there has been a demand for an anti-shake system which drives an anti-shake optical element in a new and improved driving manner that is different from those of the above described known types of anti-shake systems and advantageous for miniaturization and slimming of the imaging apparatus. In addition, in the case where voice coil motors are used as drive sources of an anti-shake system, a space-efficient arrangement of various elements of the anti-shake system such as permanent magnets, coils and sensors is also an important factor for miniaturization of the imaging apparatus. Additionally, it is also required to enhance the accuracy of supporting the various elements of the anti-shake system to achieve high anti-shake performance and optical performance.

SUMMARY OF THE INVENTION

The present invention has been devised in view of the above mentioned drawbacks and provides an imaging apparatus equipped with an anti-shake system in which an optical element used to reduce image shake is driven by voice coil motors, wherein the anti-shake system is superior in space utilization and driving accuracy, thus contributing to miniaturization and slimming of the imaging apparatus.

According to an aspect of the present invention, an imaging apparatus is provided, including a front lens group which constitutes part of an imaging optical system of the imaging apparatus and is provided at a fixed position with respect to an optical axis direction, wherein the front lens group includes at least one front lens element and a prism, in that order from an object side, and wherein light rays exiting from the front lens element along a first optical axis are reflected by the prism to travel along a second optical axis that is nonparallel to the first optical axis; at least one rear lens group which constitutes another part of the imaging optical system and is provided closer to an image plane side than the front lens group; a prism holder which supports at least the prism of the front lens group; a movable frame which supports the front lens element of the front lens group and is supported by the prism holder to be movable along a plane orthogonal to the first optical axis; and a driver which drives the movable frame along the plane, in response to vibrations applied to the photographing optical system, to reduce image shake on the image plane. The driver includes a permanent magnet and a coil positioned in a magnetic field of the permanent magnet, wherein one of the permanent magnet and the coil is a movable element which is fixed to the movable frame to move with the movable frame, the other of the permanent magnet and the coil is a fixed element, which does not move with the movable frame, and a position of the fixed element is determined by the prism holder.

According to this structure, each element of the anti-shake system such as the permanent magnet and the coil can be installed in place via the high-precision (tight-tolerance) prism holder, which supports the prism, as a positional reference, which is advantageous with respect to the driving accuracy and supporting precision of the front lens element by the driver. In addition, the arrangement of various elements of the anti-shake system such as the permanent magnet and the coil around the prism makes the structure of the imaging apparatus superior also in space utilization.

It is desirable for the movable frame to include a lens holding portion which holds the front lens element; and a movable element holding portion which holds the movable element and is formed closer to the image plane side than the lens holding portion in a direction of the first optical axis, wherein the movable element, which is held by the movable element holding portion, is positioned within a range of thickness of the prism in the direction of the first optical axis.

According to this structure, the movable element is positioned within the range of the thickness of the prism in the direction of the first optical axis, so that the area peripheral to the prism can be effectively utilized to thereby reduce the size (thickness) of the anti-shake system in the direction of the first optical axis. Namely, the effective utilization of the area peripheral to the prism contributes to a slimming of the imaging apparatus.

In the imaging apparatus according to the present invention, either the permanent magnet or the coil can be fixed to the movable frame. However, it is desirable for the permanent magnet to be the movable element and the coil to be the fixed element, wherein the imaging apparatus further includes a detecting member which detects a position of the movable member that is driven by the driver, and the prism holder includes a first positioning portion and a second positioning portion which position the coil and the detecting member at different positions in the direction of the first optical axis, respectively.

It is desirable for the first positioning portion and the second positioning portion of the prism holder to be positioned opposed to each other in the direction of the first optical axis with the movable element positioned therebetween.

It is desirable for one of the coil and the detecting member that is positioned on the image plane side in the direction of the first optical axis to be positioned within a range of thickness of the prism in the direction of the first optical axis. According to this configuration, it becomes easier to slim down the imaging apparatus.

Although the installation positions of the coil and the detecting member in the direction of the first optical axis are optional, for instance the first positioning portion and the second positioning portion can be positioned on the object side and the image plane side, respectively, in the direction of the first optical axis.

It is desirable for the coil and the detecting member to be supported by a board thereon which is fixed to the prism holder.

It is desirable for the board to include a first planar portion and a second planar portion which are opposed to each other in the direction of the first optical axis and are substantially orthogonal to the first optical axis; and a connecting portion which extends in the direction of the first optical axis and connects the first planar portion and the second planar portion. The coil and the detecting member are supported by opposed surfaces of the first planar portion and the second planar portion thereon which are opposed to each other in the direction of the first optical axis, respectively. The movable element is positioned between the opposed surfaces of the first planar portion and the second planar portion.

The positioning of the coil and the detecting position is reliably achieved by the first planar portion that supports the coil being in contact with and supported by the prism holder. The prism holder is provided with a recess into which the detecting member is fitted and supported thereby.

To further ensure the positioning of the detecting member, it is desirable for the imaging apparatus to include a retaining member which is provided as a separate member from the board and is fixed to the prism holder to press the second planar portion from an outer side with the detecting member fitted into the recess and supported thereby.

In the imaging apparatus according to the present invention, the effectiveness of the structure in which all the elements of the anti-shake system are aggregated on the periphery of the prism holder can be enhanced by forming the prism holder as a separate member from the housing that supports the rear lens group thereinside. The board that supports the coil and the detecting member can be attached over the housing and the prism or only onto the prism holder without being supported by the housing. In the latter case, the anti-shake system can be completed on the prism holder side, without using the housing, so that the anti-shake system can be inspected and adjusted in a unitized state including the front lens group, which is superior in workability.

It is desirable for the imaging apparatus to include a biaser which biases the movable frame toward the image plane side in the direction of the first optical axis to make the movable frame be supported by the prism holder.

It is desirable for the imaging apparatus to include a resistance reducing member which is sandwiched between the movable frame and the prism holder to reduce frictional resistance between the movable frame and the prism holder when the movable frame moves relative to the prism holder.

It is desirable to use rollable balls or a sheet with a low frictional resistance as the resistance reducing member.

Although the present invention does not limit the number of magnets or coils of the driver, it is practical for the imaging apparatus to have two permanent magnets which are positioned so that a magnetic pole boundary line of the first magnet and a magnetic pole boundary line of the second magnet are orthogonal to each other in a plane orthogonal to the first optical axis, and to have two coils which are positioned to be opposed to the two permanent magnets in the direction of the first optical axis, respectively.

According to the present invention, the front lens element of the front lens group, which is positioned in front of the prism of the front lens group, is moved in directions orthogonal to an optical axis (the first optical axis) to counteract image shake, which makes it possible to achieve miniaturization of the imaging apparatus in an efficient manner, even though it incorporates an anti-shake system, especially with respect to a reduction in thickness of the imaging apparatus in the forward/rearward direction. In addition, the positioning of the permanent magnet and the coil, which constitute a driver of the anti-shake system, and the detecting member, which detects the state of the anti-shake driving, is achieved with high precision via the prism holder, so that high-precision anti-shake performance and optical performance are achieved. In addition, the area peripheral to the prism can be effectively utilized to arrange the permanent magnet, the coil and the detecting member therein, which makes it possible to achieve miniaturization of the imaging apparatus that includes the anti-shake system, especially slimming of the imaging apparatus.

The present disclosure relates to subject matter contained in Japanese Patent Application No. 2012-210276 (filed on Sep. 25, 2012) which is expressly incorporated herein by reference in its entirety.

BRIEF DESCRIPTION OF THE DRAWINGS

The present invention will be described below in detail with reference to the accompanying drawings in which:

FIG. 7 is a longitudinal sectional view taken along the line VII-VII shown in FIG. 4;

DESCRIPTION OF THE PREFERRED EMBODIMENTS

Figure 1:
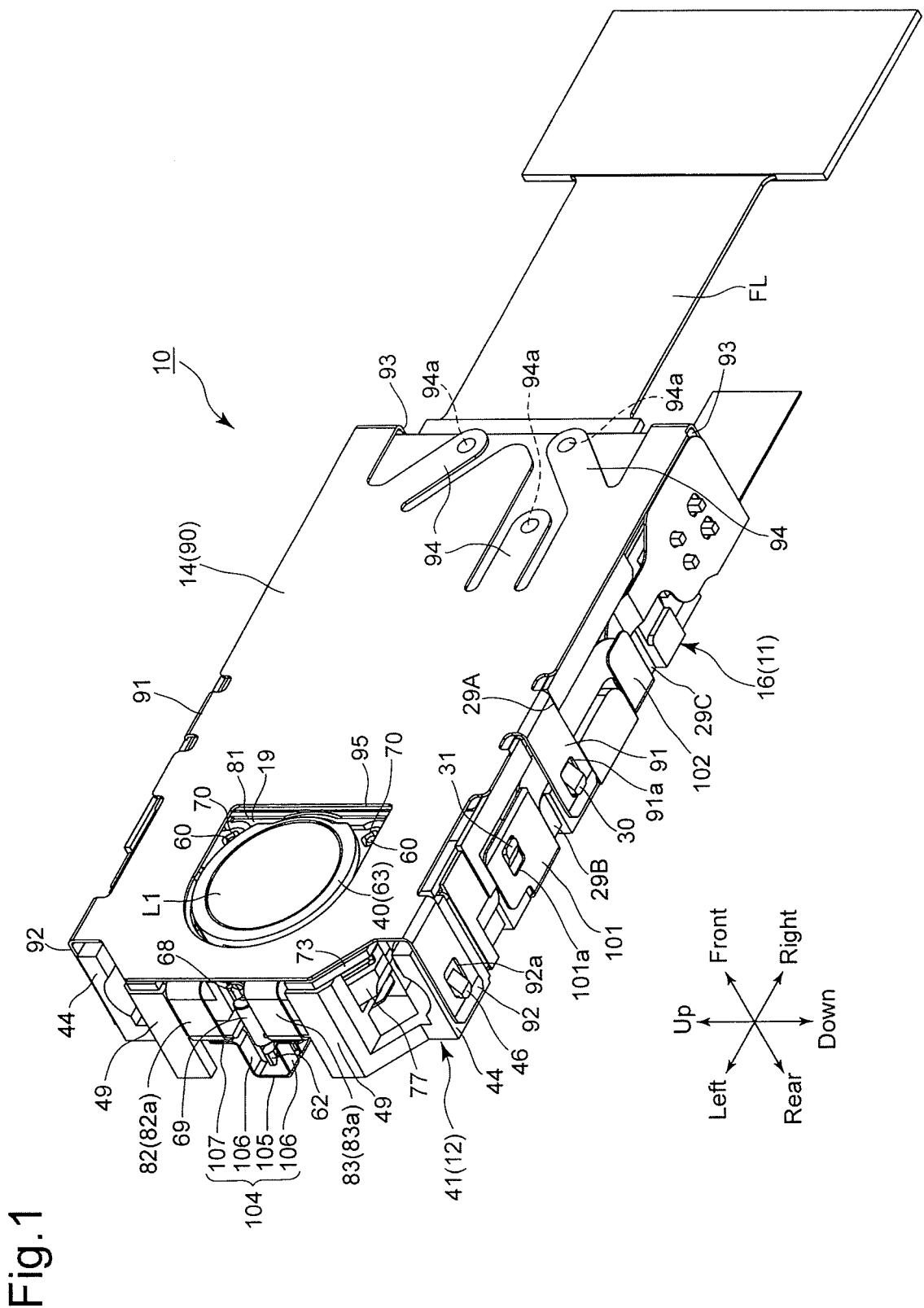
FIG. 1 is a perspective view of an embodiment of an imaging unit according to the present invention.

An embodiment of an imaging unit (imaging apparatus) 10 according to the present invention will be discussed below with reference to FIGS. 1 through 12. In the following descriptions, forward and rearward directions, leftward and rightward directions, and upward and downward directions are determined with reference to the directions of the double-headed arrows shown in the drawings. The object side corresponds to the front side. As shown by the outward appearance of the imaging unit 10 in FIGS. 1 and 4, the imaging unit 10 has a laterally elongated shape which is slim in the forward/rearward direction and long in the leftward/rightward direction.

Figure 6:
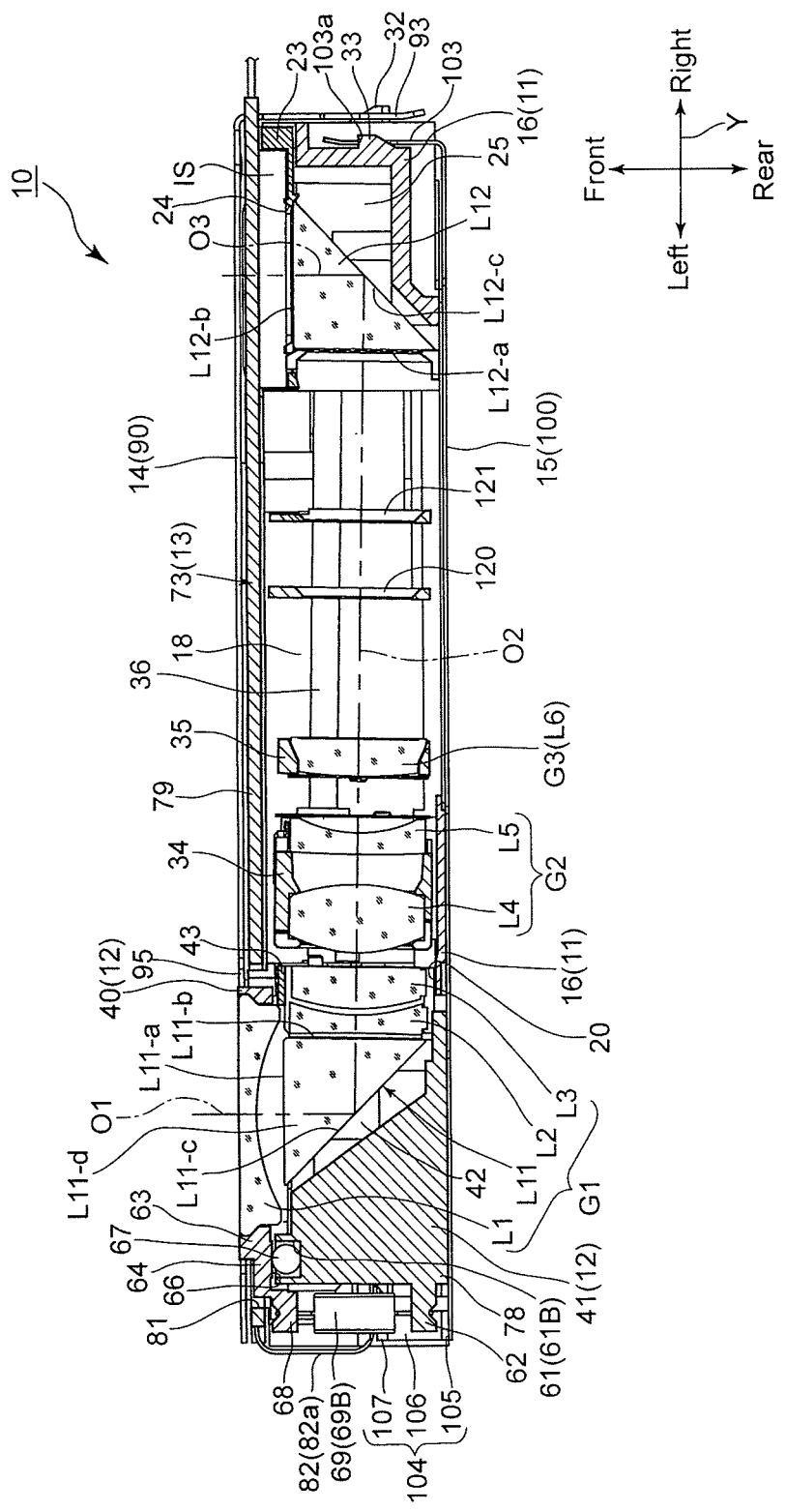
FIG. 6 is a transverse sectional view taken along the line VI-VI shown in FIG. 4.
Figure 12:
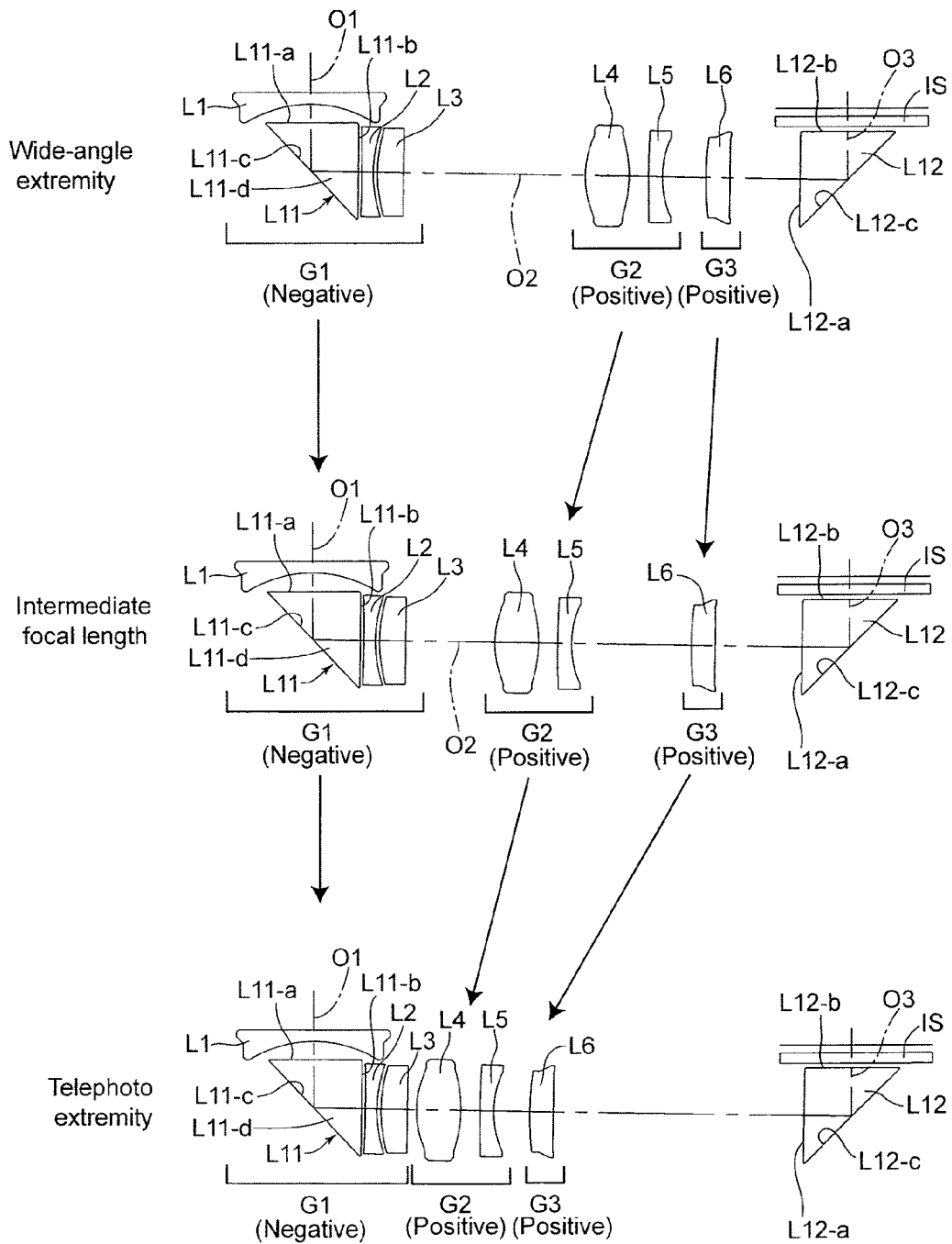
FIG. 12 shows sectional side elevational views of the optical system of the imaging unit when set at the wide-angle extremity, an intermediate focal length and the telephoto extremity.

As shown in FIGS. 6 and 12, the imaging unit 10 is provided with a first lens group (front lens group) G1, a second lens group (rear lens group) G2 and a third lens group (rear lens group) G3. The first lens group G1 is provided with a first prism L11 and the imaging unit 10 is provided with a second prism L12 on the right-hand side of the third lens group G3, and the imaging unit 10 is configured as a bending optical system which reflects (bends) light rays at substantially right angles at each of the first prism L11 and the second prism L12.

The first lens group G1 is configured of a first lens element (front lens element) L1, the first prism L11, a second lens element (rear lens element) L2 and a third lens element (rear lens element) L3. The first lens element L1 is positioned in front of (on the object side of) an incident surface L11-a of the first prism L11, while the second lens element L2 and the third lens element L3 are positioned on the right-hand side (image plane side) of an exit surface L11-b of the first prism L11. The first lens element L1 is a negative lens element (planoconcave lens element), the exit surface of which that faces the first prism L11 is formed as a concave surface. The second lens element L2 is a negative lens element (biconcave lens element), the incident and exit surfaces of which are each formed as a concave surface. The third lens element L3 is a positive lens element (meniscus lens element), the incident surface of which is formed as a convex surface. The first lens group G1 has a negative refractive power overall.

The second lens group G2 is configured of a fourth lens element L4 and a fifth lens element L5. The fourth lens element L4 is a positive lens element (biconvex lens element), the incident and exit surfaces of which are each formed as a convex surface, and the fifth lens element L5 is a negative lens element (meniscus lens element), the incident and exit surfaces of which are formed as a convex surface and a concave surface, respectively, and the second lens group G2 has a positive refractive power overall.

The third lens group G3 is configured of a sixth lens element L6 that is a positive lens element (planoconvex lens element), the exit surface of which is formed as a convex surface. The third lens group G3 has a positive refractive power.

Light rays emanated from the photographic object to be incident on the first lens element L1 along a first optical axis O1 extending in the rearward direction are reflected by a reflecting surface L11-*c* of the first prism L11 in a direction along a second optical axis O2 (extending in the rightward direction) to pass through each of the second through sixth lens elements L2, L3, L4, L5 and L6 that lie on the second optical axis O2. Subsequently, the light rays exiting from the sixth lens element L6 are reflected by a reflecting surface L12-*c* of the second prism L12 in a direction along a third optical axis O3 (extending in the forward direction) and are incident on the imaging surface of an image sensor IS to form an object image thereon. The first optical axis O1 and the third optical axis O3 are substantially parallel to each other and lie, together with the second optical axis O2, on a common plane (a first imaginary plane P1 shown in FIGS. 4, 5, 7 and 11). The imaging optical system of the imaging unit 10 is a zoom lens system, and a zooming operation (power-varying operation) is performed by moving the second lens group G2 and the third lens group G3 along the second optical axis O2. In addition, a focusing operation is performed by moving the third lens group G3 along the second optical axis O2. Accordingly, the imaging optical system of the imaging unit 10 is a zoom lens system configured of three lens groups having negative power, positive power and positive power, respectively, in that order from the object side; additionally, the position of the first lens group G1 in the optical axis direction is fixed during zooming, while the second lens group G2 and the third lens group G3 are movable lens groups which move along the second optical axis O2 during zooming. The imaging unit 10 is provided with an anti-shake (image shake correction/image stabilizing/shake reduction) system which reduces image shake on an image plane that is caused by vibrations such as hand shake; details on this anti-shake system will be discussed later. This anti-shake system is for driving the first lens element L1, which is an element of the first lens group G1, in a plane orthogonal to the first optical axis O1. The first optical axis O1 in the following descriptions and the drawings denotes the position of an optical axis passing through the first lens element L1 in a state where the first lens element L1 sits exactly at the center of the driving range thereof by the anti-shake system (i.e., at an initial optical-design position of the first lens element L1 when no image shake correction operation is performed). In a direction along the first optical axis O1, the front and the rear of the imaging unit 10 correspond to the object image side and the image plane side, respectively.

Figure 2:
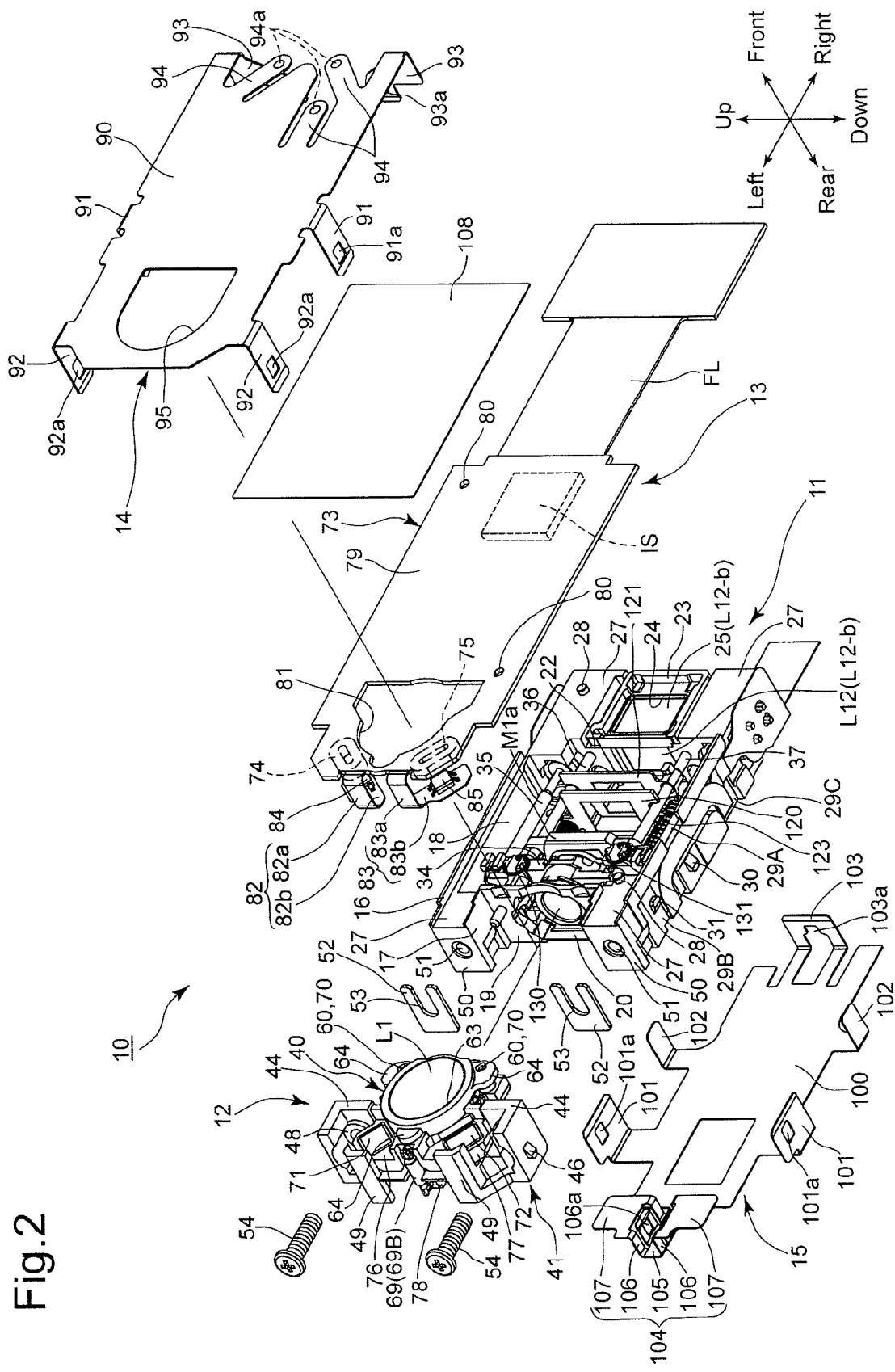
FIG. 2 is an exploded perspective view of the imaging unit.

As shown in FIGS. 1 and 2, the imaging unit 10 is provided with a body module 11, a first lens-group unit 12, a board module 13, a front cover 14 and a rear cover 15, as major components of the imaging unit 10.

The body module 11 is provided with a housing 16 made of synthetic resin, and the second lens group G2, the third lens group G3 and the second prism L12 that constitute elements of the imaging optical system are held by the housing 16 therein. The housing 16 is a box-shaped member which is elongated in the leftward/rightward direction and small in thickness (slim) in the forward/rearward direction. The housing 16 is provided at the left end thereof with a mounting recess 17. The housing 16 is provided, on the front side thereof in a section positioned on the right side of the mounting recess 17, with an accommodating recess 18 that is substantially rectangular in cross sectional shape. The housing 16 is provided between the mounting recess 17 and the accommodating recess 18 with a partition wall 19. The housing 16 is provided at a center of the partition wall 19 with a communication hole (through-hole) 20, via which the mounting recess 17 and the accommodating recess 18 are communicatively connected with each other. The housing 16 is provided, on the right side of the accommodating recess 18, with a positioning recess 22 having a substantially rectangular shape, in a front view. The positioning recess 22 is formed to be positioned at a forward position with respect to the base surface of the accommodating recess 18. A packing 23 made of an elastically deformable material is positioned in the positioning recess 22 and supported thereby. The packing 23 is in the shape of a rectangular frame which is fitted into the positioning recess 22. The packing 23 is provided at the bottom (in the base) thereof with a through-hole 24. The housing 16 is provided in the positioning recess 22 with a prism mounting recess 25 which is open at the front and left sides. The housing 16 is provided, around the front edge of the inner peripheral surface of the accommodating recess 18, with a board support surface 27 which is positioned at a rearward position with respect to the frontmost end of the housing 16 and lies in a plane orthogonal to the forward/rearward direction. The housing 16 is further provided, on the board support surface 27 at two different positions thereon, with two lock projections 28, respectively, which project forward from the board support surface 27. The housing 16 is provided on each of the upper and lower sides thereof with three engaging recesses 29A, 29B and 29C and two engaging projections 30 and 31. The housing 16 is further provided on the right side thereof with an upper and lower pair of engaging projections 32 (see FIG. 5) and an engaging projection 33 (see FIG. 6).

The second prism L12 is fit-engaged into the prism mounting recess 25 and fixed thereto. The second prism L12 is provided with an incident surface L12-*a*, an exit surface L12-*b* and the reflecting surface L12-*c*. The incident surface L12-*a* is positioned on the second optical axis O2 and faces leftward, the exit surface L12-*b* is positioned on the third optical axis O3 and faces forward, and the reflecting surface L12-*c* is angled at substantially 45 degrees with respect to the incident surface L12-*a* and the exit surface L12-*b*. With the second prism L12 fixed to the prism mounting recess 25, the exit surface L12-*b* is forwardly exposed through the through-hole 24 of the packing 23.

The second lens group G2 and the third lens group G3 are supported to be positioned on the second optical axis O2 on the left-hand side of the incident surface L12-*a* of the second prism L12. The body module 11 is provided with a first rod 36 and a second rod 37, each of which is cylindrical in shape, made of metal and extends linearly in the leftward/rightward direction. The first rod 36 and the second rod 37 are each fixed at both ends thereof to an inner surface of the right side wall of the housing 16 and the partition wall 19 so that the first rod 36 and the second rod 37 are aligned in the upward/downward direction. A through-hole formed on an upper part of a second lens group frame 34, made of synthetic resin, is fitted onto the first rod 36, while a rotation stop groove formed in a lower end of the second lens group frame 34 is engaged with the second rod 37. Since this engagement of the aforementioned rotation stop groove with the second rod 37 prevents the second lens group frame 34 from rotating about the first rod 36, the second lens group frame 34 is slidable in the leftward/rightward along the first rod 36 and the second rod 37. The fourth lens element L4 and the fifth lens element L5, which constitute the second lens group G2, are fit-engaged into and fixed to a lens holding hole formed through the second lens group frame 34 in the leftward/rightward direction. Additionally, a nut holding portion 34a (see FIG. 5) is formed at the upper end of the second lens group frame 34, and a driven nut 38 (see FIG. 5) having a female screw hole, the axis of which extends in the leftward/rightward direction, is engaged with the nut holding portion 34a so as not to rotate relative to the nut holding portion 34a (a portion of the nut holding portion 34a constitutes a rotation stop for the driven nut 38). The nut holding portion 34a and the driven nut 38 are resiliently connected to each other by a torsion spring 130. The body module 11 is provided with a first motor M1 (see FIG. 5) which is fixed to the housing 16 in an upper part of the prism mounting recess 25. The first motor M1 is a stepping motor and is provided with a rotary drive shaft M1a which extends linearly leftwards, and a male thread formed on the rotary drive shaft M1a is screw-engaged with the female screw hole of the driven nut 38. Accordingly, forward and reverse rotations of the rotary drive shaft M1a of the first motor M1 cause the second lens group frame 34 (the second lens group G2) to move linearly in the leftward/rightward direction along the first rod 36 and the second rod 37.

A through-hole formed through a lower part of a third lens group frame 35 made of synthetic resin and positioned on the right-hand side of the second lens group frame 34 is fitted onto the second rod 37, while a rotation stop groove formed on an upper end of the third lens group frame 35 is engaged with the first rod 36, and accordingly, the third lens group frame 35 is slidable in the leftward/rightward direction along the first rod 36 and the second rod 37 (while being prevented from rotating about the second rod 37). The sixth lens element L6, which constitutes an element of the third lens group G3, is fit-engaged into and fixed to a lens holding hole formed through the third lens group frame 35 in the leftward/rightward direction, a nut holding portion 35a (see FIG. 5) is formed at the lower end of the third lens group frame 35, and a driven nut 39 (see FIG. 5) having a female screw hole, the axis of which extends in the leftward/rightward direction, is engaged with the nut holding portion 35a so as not to rotate relative to the nut holding portion 35a (a portion of the nut holding portion 35a constitutes a rotation stop for the driven nut 39). The nut holding portion 35a and the driven nut 39 are resiliently connected to each other by a torsion spring 131. The body module 11 is provided with a second motor M2 (see FIG. 5) which is fixed to the housing 16 in a lower part of the prism mounting recess 25. The second motor M2 is a stepping motor which is identical in specifications to the first motor M1 and is provided with a rotary drive shaft M2a (identical in specifications to the rotary drive shaft M1a) which extends linearly leftwards, and a male thread formed on the rotary drive shaft M2a is screw-engaged with the female screw hole of the driven nut 39. Accordingly, forward and reverse rotations of the rotary drive shaft M2a of the second motor M2 cause the third lens group frame 39 (the third lens group G3) to move linearly in the leftward/rightward direction along the first rod 36 and the second rod 37.

The body module 11 is provided with a light shield frame 120 and a light shield frame 121 which are slidably supported by the first rod 36 and the second rod 37, respectively. The light shield frames 120 and 121 are positioned between the third lens group frame 35 (the third lens group G3) and the prism mounting recess 25 (the second prism L12), the body module 11 is provided between the light shield frame 120 and the second lens group frame 34 with a compression coil spring 122 which enables the light shield frame 120 to be held at a proper position in the slidable direction thereof, and the body module 11 is provided between the light shield frame 121 and the third lens group frame 35 with a compression coil spring 123 which enables the light shield frame 121 to be held at a proper position in the slidable direction thereof. Each of the light shield frames 120 and 121 is provided at a center thereof with a rectangular aperture, which extends therethrough in the leftward/rightward direction, and is further provided with a frame portion which surrounds the rectangular aperture. The rectangular apertures of the light shield frames 120 and 121 allow the light rays traveling from the third lens group G3 (the sixth lens element L6) to the second prism L12 to pass through the light shield frames 120 and 121, while the frame portions of the light shield frames 120 and 121 shield unwanted light.

Figure 3:
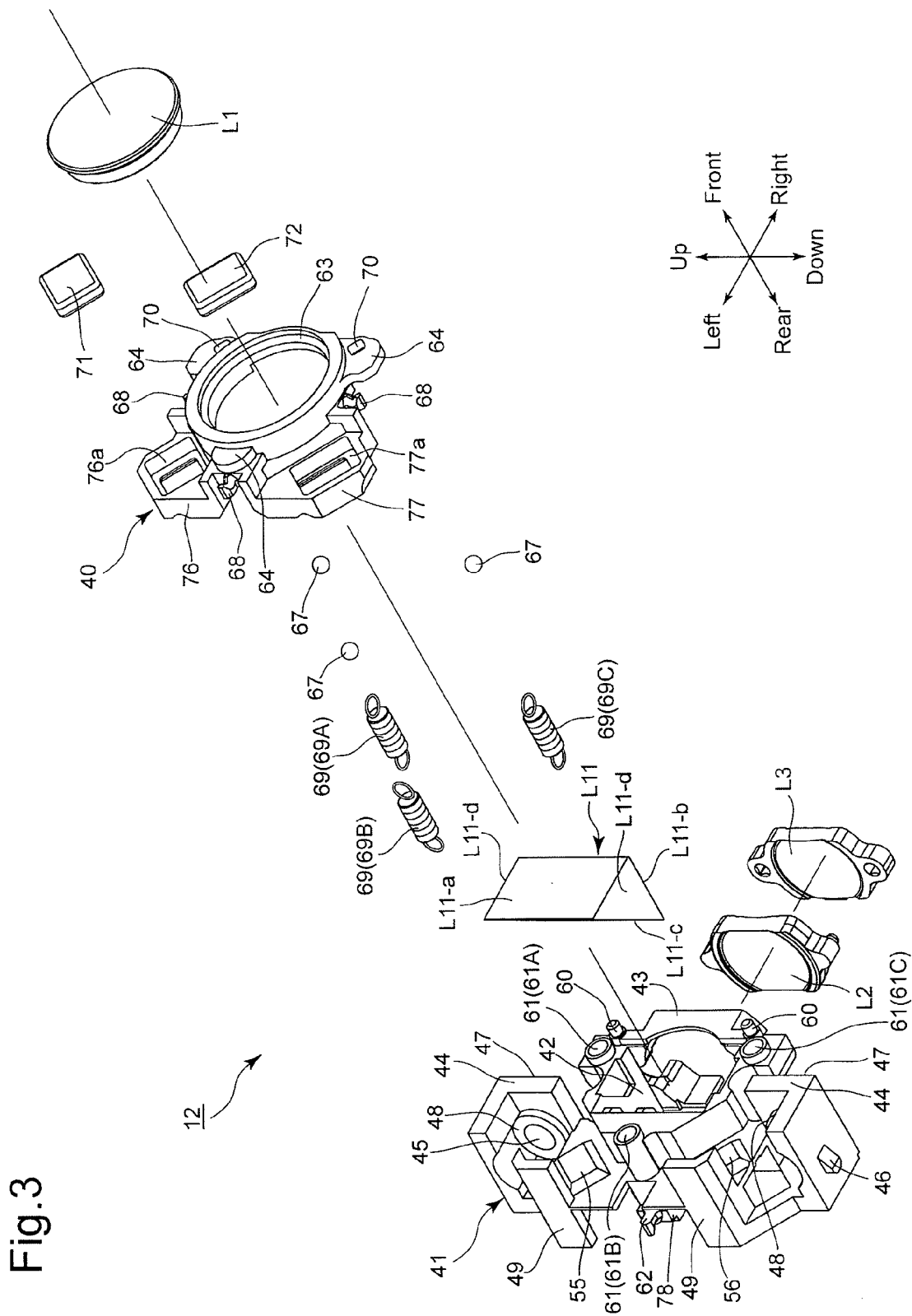
FIG. 3 is an exploded perspective view of a first lens-group unit of the imaging unit.

As shown in FIG. 3, the first lens-group unit 12 is provided with a first lens frame (movable frame) 40 which holds the first lens element L1 and a base frame (prism holder) 41 which holds the first prism L11, the second lens element L2 and the third lens element L3. As shown in FIG. 6, the base frame 41 is provided with a prism mounting recess 42 which is open at the front and right sides, and the first prism L11 is fit-engaged into the prism mounting recess 42 and fixed thereto. The first prism L11 is provided with the incident surface L11-a, the exit surface L11-b, the reflecting surface L11-c and a pair of side surfaces L11-d. The incident surface L11-a is positioned on the first optical axis O1 and faces forward, the exit surface L11-b is positioned on the second optical axis O2 and faces rightward, the reflecting surface L11-c is positioned at an angle of substantially 45 degrees with respect to the incident surface L11-a and the exit surface L11-b, and the pair of side surfaces L11-d are orthogonal to both the incident surface L11-a and the exit surface L11-b. The base frame 41 is further provided with a lens holding portion 43 which extends through the base frame 41 in the rightward direction from the prism mounting recess 42, and the second lens element L2 and the third lens element L3 are fit-engaged into the lens holding portion 43.

Figure 5:
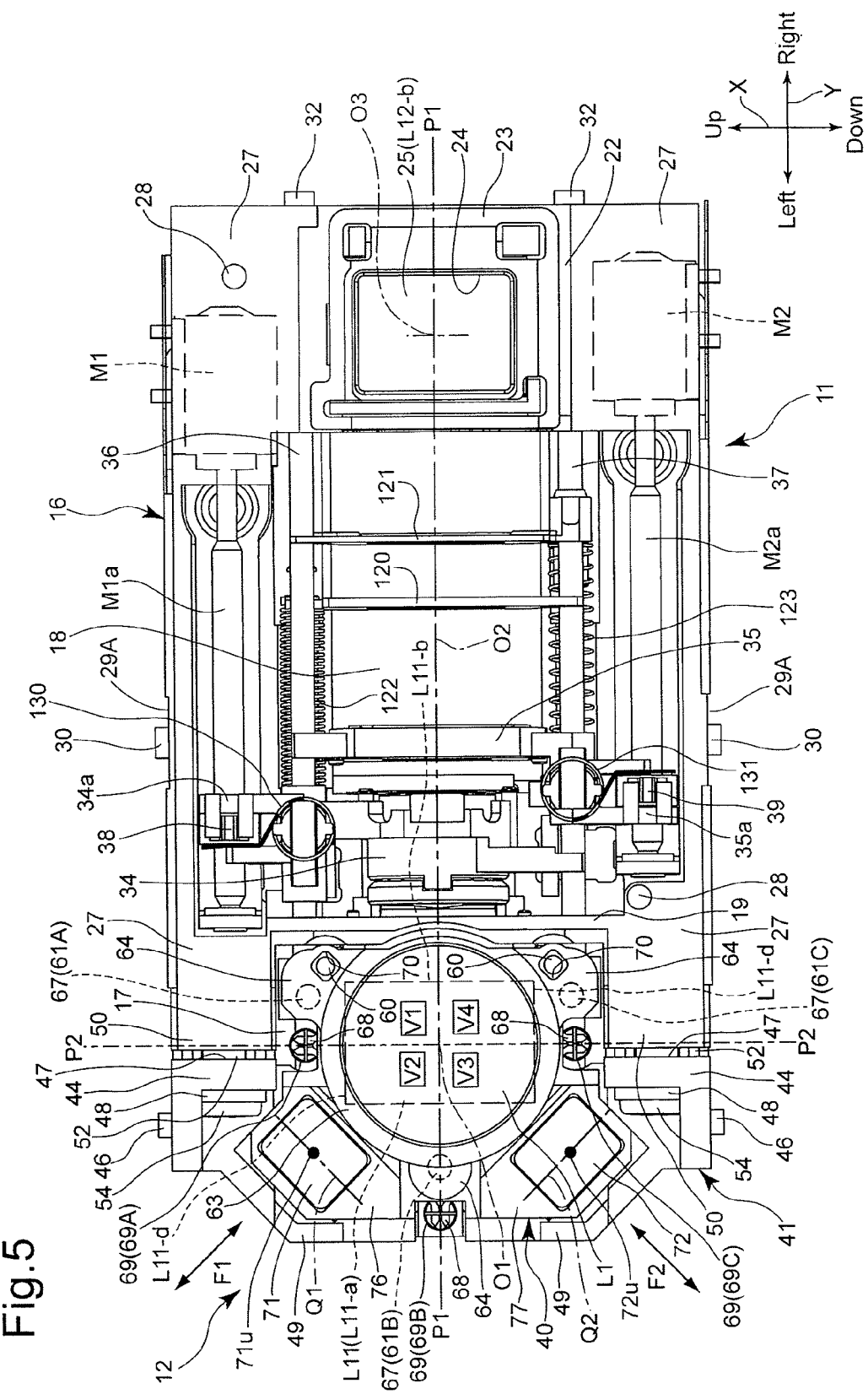
FIG. 5 is a front elevational view of the imaging unit from which a front cover and a board module are removed.

The base frame 41 is provided with a pair of flanges 44 (first positioning portion) which project upward and downward, respectively. Each flange 44 is in the shape of a letter L (or an inverted L) in a front view as shown in FIG. 5. A screw insertion hole 45 (see FIG. 3) extends in the leftward/rightward direction through a wall (vertical wall) of each flange 44 which extends in the upward/downward direction. An engaging projection 46 is provided on, and projects from, an outer surface of a wall (horizontal wall) of each flange 44 on a part thereof that extends in the leftward/rightward direction. In each flange 44, the right side of the vertical wall of the flange 44, through which the screw insertion hole 45 is open, is formed as a flat spacer holding surface 47, and a screw seat 48 which surrounds the screw insertion hole 45 is formed on the left side of the vertical wall of the flange 44, which is on the opposite side of the flange 44 from the spacer holding surface 47. The base frame 41 is provided, on the left end thereof, with an upper and lower pair of outer walls (first positioning portion) 49. In addition, the base frame 41 is provided in the vicinity of the upper and lower pair of outer walls 49 with an upper and lower pair of sensor support portions (second positioning portion) 55 and 56, respectively (see FIGS. 3, 7, 10 and 11). Each of the sensor support portions 55 and 56 is in the shape of a substantially rectangular recess which faces toward the rear of the base frame 41 (leftward with respect to FIG. 7).

Figure 8:
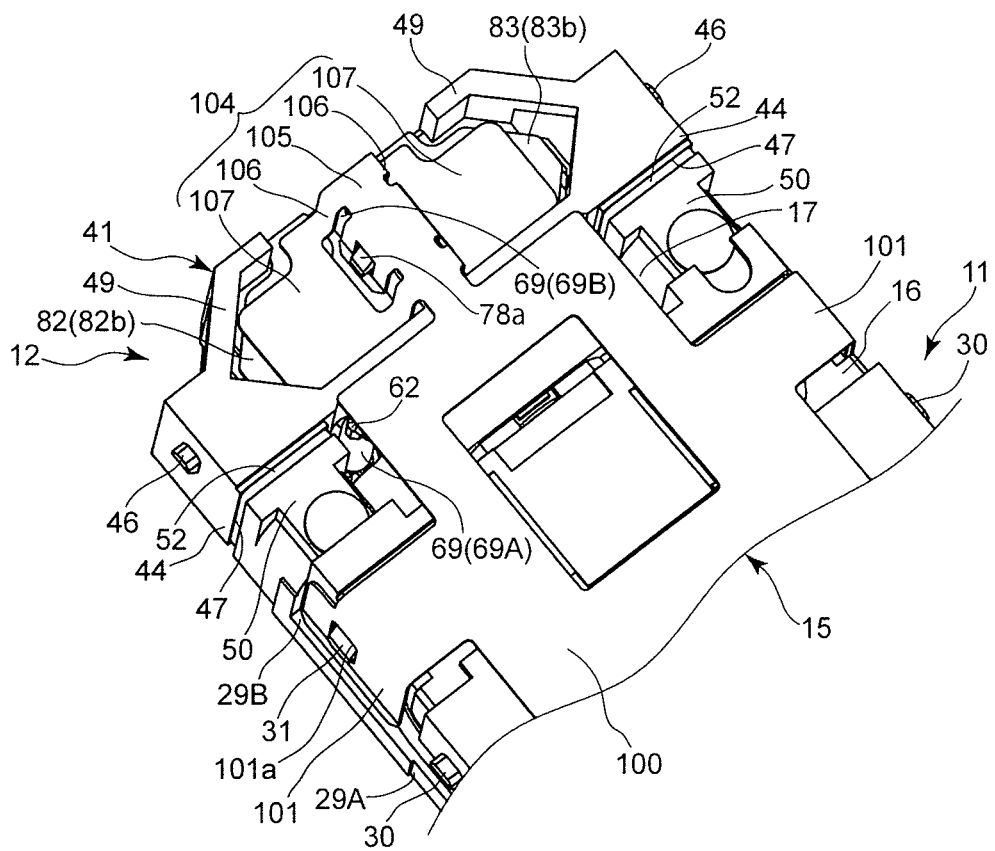
FIG. 8 is a rear perspective view of part of the imaging unit.
Figure 9:
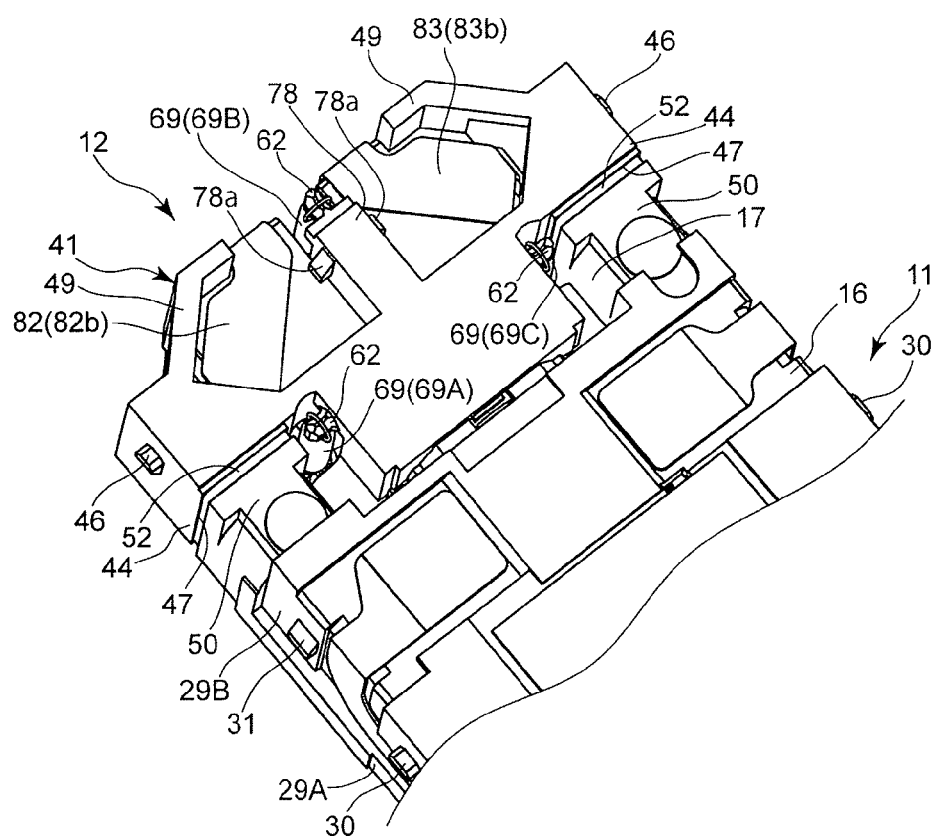
FIG. 9 is a rear perspective view of the part of the imaging unit shown in FIG. 8 from which a rear cover is removed.
Figure 10:
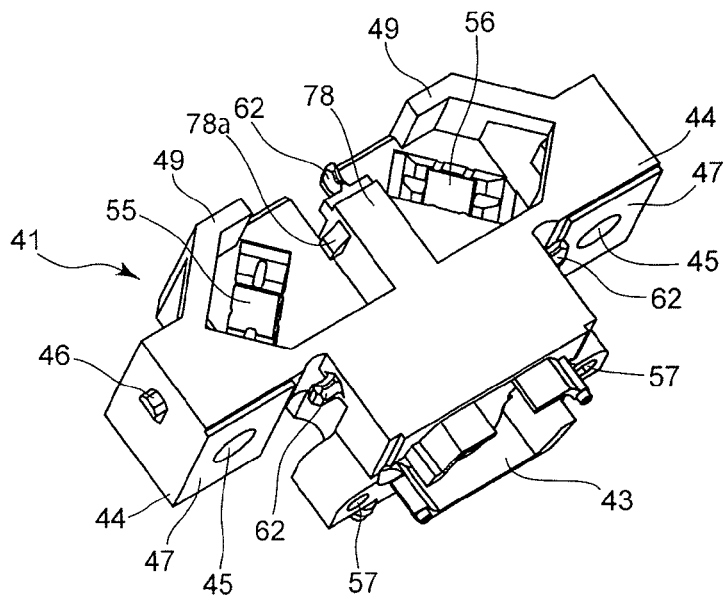
FIG. 10 is a rear perspective view of a base frame of the imaging unit.

As shown in FIGS. 5, 8 and 9, a portion of the base frame 41 from the pair of flanges 44 rightward has a shape that enables the portion of the base frame 41 to be fitted into the mounting recess 17. The left ends of the first rod 36 and the second rod 37 project leftward from the partition wall 19 of the housing 16 (a state where the left end of the first rod 36 projects leftward from the partition wall 19 is shown in FIG. 2). When the base frame 41 is fit-engaged into the mounting recess 17, the left ends of the first rod 36 and the second rod 37 that project from the partition wall 19 are inserted into positioning holes 57 (see FIG. 10) formed in the base frame 41 to thereby fix the positions of the base frame 41 in the forward/rearward direction and the upward/downward direction. In addition, the lens holding portion 43 of the base frame 41 is fitted into the communication hole 20 of the partition wall 19 of the housing 16, and the exit surface of the third lens element L3 that constitutes an element of the first lens group G1 faces the incident surface of the fourth lens element L4 that constitutes an element of the second lens group G2.

A pair of flange support seats 50 are formed on the housing 16 at positions immediately above and below the mounting recess 17, respectively, and a screw hole 51 is formed in each flange support seat 50 so that the axis of the screw hole 51 extends in the leftward/rightward direction. The pair of flange support seats 50 face the spacer holding surfaces 47 of the pair of flanges 44 of the base frame 41, and the position of the base frame 41 relative to the housing 16 in the leftward/rightward direction is determined by the distance between the spacer holding surfaces 47 of the pair of flanges 44 and the pair of flange support seats 50. A pair of spacers 52 for adjustment of the aforementioned distance are installed and held between the pair of flanges 44 (the spacer holding surfaces 47) and the pair of flange support seats 50, respectively. Each spacer 52 is in the shape of a rectangular plate and is provided with a screw insertion groove 53 which is formed (recessed) toward the center of the spacer 52 from one side thereof. Various types of spacers 52 having different thicknesses are prepared in advance, and a pair of spacers 52 having an appropriate thickness are selected from these spacers 52 and inserted in between the spacer holding surfaces 47 of the pair of flanges 44 and the pair of flange support seats 50. Thereafter, the screw shafts of two set screws 54 are screwed into the screw holes 51 of the pair of flange support seats 50 through the screw insertion holes 45 of the pair of flanges 44 and the screw insertion grooves 53 of the pair of spacers 52, respectively, and the set screws 54 are tightened until the heads of the two set screws 54 come into contact with the two screw seats 48, respectively. This secures the base frame 41 to the housing 16. The relative position between the first lens group G1 and the second lens group G2 in a direction along the second optical axis O2 can be changed by changing the thickness of each spacer 52 (by replacing each spacer 52 by another spacer 52 having a different thickness). More specifically, the distance between the third lens element L3 and the fourth lens element L4 is changed. The effect of the flange back adjustment on the entire imaging optical system is obtained by a change in the position of the first lens group G1, which has a predetermined refractive power, in the optical axis direction.

The imaging unit 10 is provided with an anti-shake (image shake correction/image-stabilizing/shake reduction) system that reduces image shake on an image plane which is caused by vibrations such as hand shake. This anti-shake system drives the first lens element L1 of the first lens group G1 in a plane orthogonal to the first optical axis O1; more specifically, the anti-shake system drives the first lens frame 40 relative to the base frame 41 in this orthogonal plane in response to vibrations applied to the imaging optical system. The base frame 41 is provided around the prism mounting recess 42 with two movement limit projections (movement limiter) 60 which project forwardly and three ball support holes 61, which are bottomed holes that are open toward the front. The three ball support holes 61 are arranged at substantially regular intervals in a circumferential direction about the first optical axis O1. The base frame 41 is further provided with three spring hook projections 62. As shown in FIGS. 8 through 11, two of the three spring hook projections 62 are formed to project vertically in opposite directions away from each other to be spaced from each other in the long-side direction of the incident surface L11-$a$ of the first prism L11, while the remaining one spring hook projection 62 is formed at the left end of a support protrusion 78 which projects leftward with respect to the prism mounting recess 42.

The first lens frame 40 is provided with a cylindrical lens holding portion 63 and is provided, at different positions around the lens holding portion 63 with three flanges 64, respectively, which project radially outwards. Three ball contact surfaces 66 (see FIGS. 6 and 7) are formed on the rear surfaces of the flanges 64, respectively, and three guide balls (resistance reducing members) 67 are held between the ball contact surfaces 66 and the bottom surfaces of the ball support holes 61, respectively. The ball contact surfaces 66 are flat surfaces substantially orthogonal to the first optical axis O1. The guide balls 67 are loosely fitted into the ball support holes 61 with respect to directions orthogonal to the first optical axis O1, respectively. When positioned at or in the close vicinity of the center of the associated support hole 61, each guide ball 67 does not come in contact with the inner wall of the associated ball support hole 61.

The first lens frame 40 is provided, at different circumferential positions on the outer periphery thereof, with three spring hook projections 68, respectively, and three extension springs (biaser) 69 are extended and installed between the spring hook projections 68 and the spring hook projections 62 that are formed on the base 41, respectively. The first lens frame 40 is biased in a direction to approach the base frame 41 (i.e., is biased rearward) by the biasing force of the extension springs 69 to make the ball contact surfaces 66 press against the guide balls 67, respectively, to thereby prevent the first lens frame 40 from moving rearward. In this state, the ball contact surfaces 66 are in point contact with the guide balls 67, respectively, and the first lens frame 40 can move in directions orthogonal to the first optical axis O1 by making the ball contact surfaces 66 slidingly contact the guide balls 67 (or while making the guide balls 67 roll when the guide balls 67 are not in contact with the inner walls of the ball support holes 61, respectively). The prism mounting recess 42, the flanges 44 and the outer walls 49 of the base frame 41 are formed to have shapes so as not to interfere with the movement of the first lens frame 40.

Figure 4:
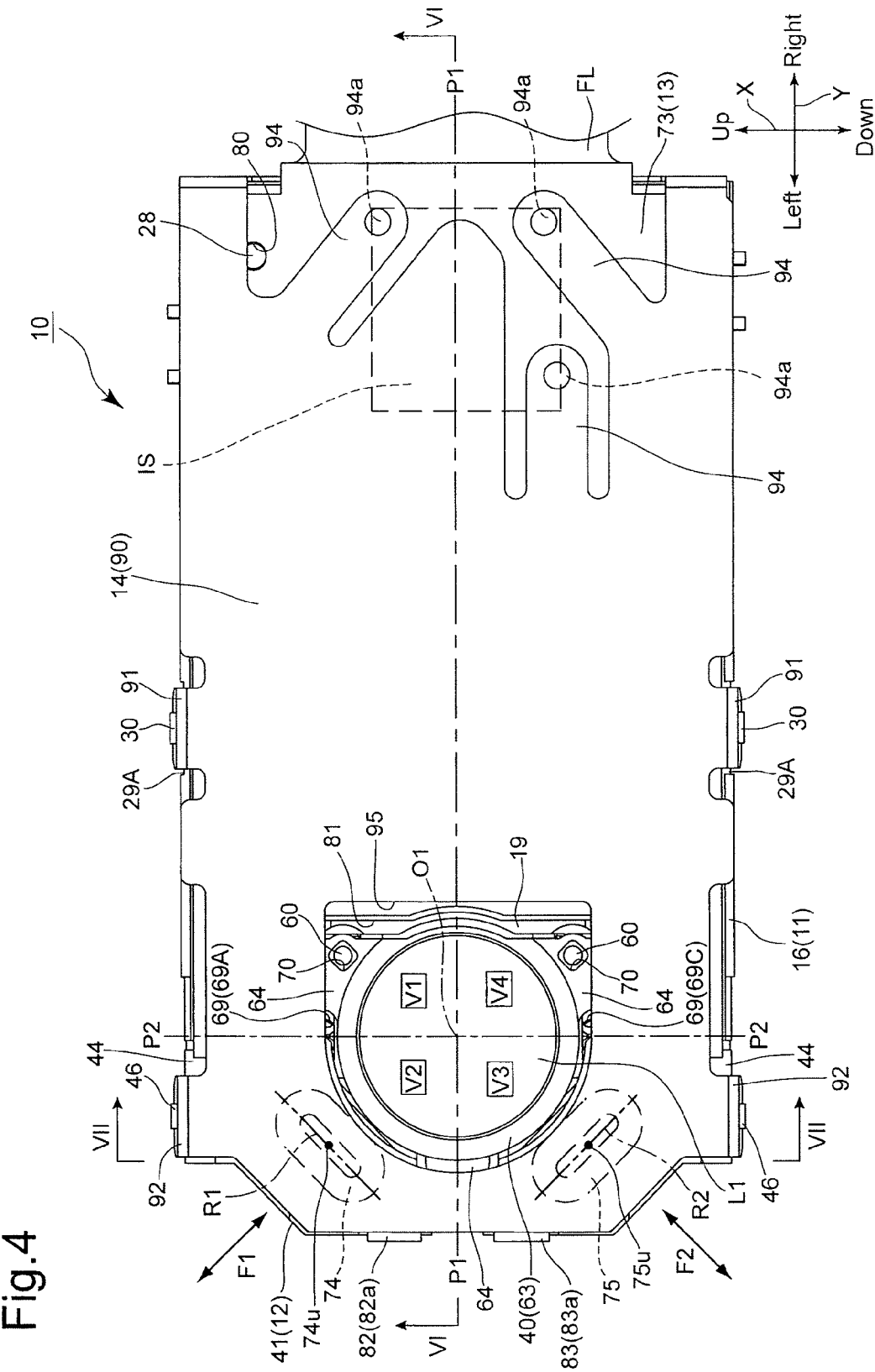
FIG. 4 is a front elevational view of the imaging unit.

The first lens frame 40 is further provided with two movement limit holes 70 into which the movement limit projections 60 of the base frame 41 are inserted, respectively. As shown in FIGS. 4 and 5, the inner wall of each movement limit hole 70 is rectangular, generally square in shape in a plane substantially orthogonal to the first optical axis O1. In the following descriptions, the direction of one of the two diagonal lines across the inner wall of each movement limit hole 70 in a plane orthogonal to the first optical axis O1 refers to the X-axis direction and the direction of the other diagonal line refers to the Y-axis direction. The X-axis direction generally coincides with the upward/downward direction of the imaging unit 10, and the Y-axis direction generally coincides with the leftward/rightward direction of the imaging unit 10. The first lens frame 40 can move relative to the base frame 41 in a plane orthogonal to the first optical axis O1 within a range until the movement limit projections 60 come into contact with the inner walls of the movement limit holes 70, respectively.

Figure 11:
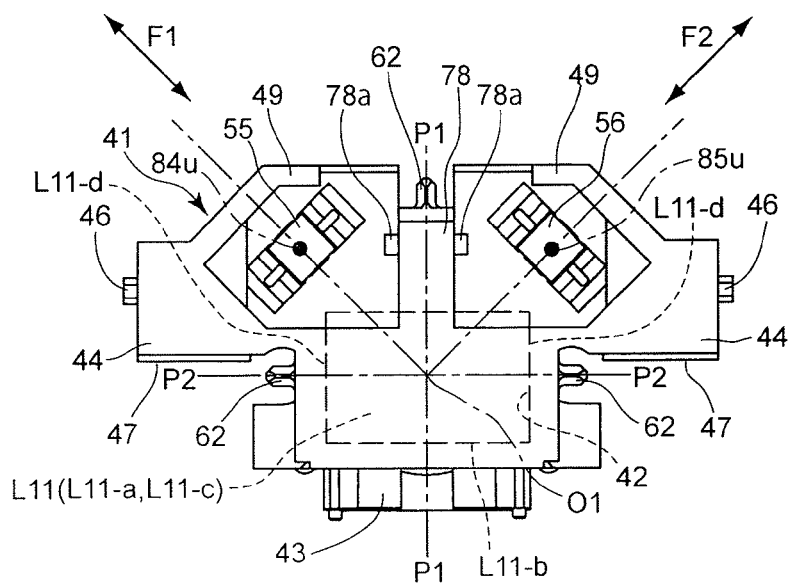
FIG. 11 is a rear elevational view of the base frame.

As shown in FIGS. 5 and 11, the incident surface L11-*a* of the first prism L11, which is installed in the base frame 41 and supported thereby, is in the shape of a non-square rectangle which is surrounded by two pairs of sides (two long sides and two short sides). The first prism L11 is positioned in the base frame 41 so that the long sides of the incident surface L11-*a* extend upward and downward and that the short sides of the incident surface L11-*a* extend leftward and rightward. In the following descriptions, the long side of the incident surface L11-*a* that adjoins the exit surface L11-*b* (and which constitutes the boundary between the incident surface L11-*a* and the exit surface L11-*b*) is referred to as the exit long-side of the incident surface L11-*a*, and the long side of the incident surface L11-*a* that is on the opposite side of the incident surface L11-*a* from the aforementioned long side thereof and far from the exit surface L11-*b* (and which constitutes the boundary between the incident surface L11-*a* and the reflecting surface L11-*c*) is referred to as the end long-side of the incident surface L11-*a*. The pair of short sides of the incident surface L11-*a*, which connect the exit long-side and the end long-side of the incident surface L11-*a*, constitute the boundaries between the incident surface L11-*a* and the pair of side surfaces L11-*d*. Two of the three ball support holes 61 (specifically the two ball support holes 61A and 61C shown in FIG. 3) are formed at positions along the pair of short sides of the incident surface L11-*a* of the first prism L11, respectively. The remaining one ball support hole 61 (specifically the ball support hole 61B shown in FIG. 3) is formed at a substantially central position with respect to the end long-side of the incident surface L11-*a* of the first prism L11. Two of the three spring hook projections 62 are formed at substantially central positions with respect to the pair of short sides of the incident surface L11-*a* of the first prism L11, respectively. The remaining one spring hook projection 62 is formed alongside the ball support hole 61B on the left-hand side thereof at a substantially central position with respect to the end long-side of the incident surface L11-*a* of the first prism L11. In addition, the two movement limit projections 60 are positioned near the boundaries between the exit long-side and the adjoining pair of short sides of the incident surface L11-*a* of the first prism L11, respectively. Accordingly, in the base frame 41, in each of the two (upper and lower) areas respectively along the short sides of the incident surface L11-*a*, one (upper or lower) spring hook projection 62, one ball support hole 61 (the upper ball support hole 61A or the lower ball support hole 61C) and one (upper or lower) movement limit projection 60 are arranged in that order from the end long-side of the incident surface L11-*a* of the first prism L11 (i.e., from the left-hand side of the incident surface L11-*a* of the first prism L11).

The three spring hook projections 68 of the first lens frame 40 are positioned in front of the three spring hook projections 62 of the base frame 41, and the relative positional relationship between the three spring hook projections 68 and the three spring hook projections 62 is such that the three spring hook projections 68 and the three spring hook projections 62 are aligned with each other in the forward/rearward direction, respectively, as viewed from front as shown in FIG. 5 when the first lens frame 40 sits at the center of the anti-shake driving range thereof. In addition, two of the three extension springs 69 (the upper extension spring 69A and the lower extension spring 69C (see FIG. 5)) that are positioned on the opposite sides of the pair of short sides of the incident surface L11-*a* of the first prism L11 and the remaining one extension spring 69 (the left extension spring 69B (see FIG. 5)) that is positioned on the left-hand side of the end long-side of the incident surface L11-*a* of the first prism L11 are each formed so that the axis of each extension spring 69 extends parallel to the first optical axis O1.

More specifically, assuming a first imaginary plane P1 (see FIGS. 4, 5, 7 and 11) which includes the first optical axis O1 and the second optical axis O2 and a second imaginary plane P2 (see FIGS. 4, 5 and 11) which is orthogonal to the first imaginary plane P1 and includes the first optical axis O1, the ball support holes 61B and the extension spring 69B (and the spring hook projection 62 and the spring hook projection 68 which support the extension spring 69B) lie in a portion of the first imaginary plane P1 which is positioned to the left of the first prism L11. The two ball support holes 61A and 61C, which are respectively formed at positions along the pair of short sides of the incident surface L11-*a* of the first prism L11, are symmetrically positioned with respect to the first imaginary plane P1 and the first prism L11. The two ball support holes 61A and 61C are positioned closer to the exit long-side of the incident surface L11-*a* of the first prism L11 than the second imaginary plane P2. The two extension springs 69A and 69C (and the two pairs of the spring hook projections 62 and the spring hook projections 68 which support the two extension springs 69A and 69C), which are respectively positioned along the pair of short sides of the incident surface L11-*a* of the first prism L11, are positioned on the second imaginary plane P2 at symmetrically opposite sides of the first imaginary plane P1 and the first prism L11. The second imaginary plane P2 passes through substantially the centers of the pair of short sides of the incident surface L11-*a* of the first prism L11. In other words, each of the extension springs 69A and 69C is positioned at a position substantially coincident with the center of the incident surface L11-*a* of the first prism L11 in the short-side direction (leftward/rightward direction) thereof. Additionally, in the long-side direction (vertical direction) of the incident surface L11-*a* of the first prism L11, the distance between the first optical axis O1 and the extension spring 69A and the distance between the first optical axis O1 and the extension spring 69C are substantially to the same each other.

The first lens frame 40 is driven by an electromagnetic actuator. This electromagnetic actuator includes two voice coil motors (VCMs) provided with two permanent magnets (elements of a driver/movable elements) 71 and 72 and two coils (elements of the driver/fixed elements) 74 and 75, respectively. The two permanent magnets 71 and 72 are supported by the first lens frame 40 and the two coils 74 and 75 are supported by a circuit board 73 of the board module 13. The permanent magnets 71 and 72 are fixed to support recesses 76*a* and 77*a* (see FIG. 3) of magnet holding portions (movable element holding portions) 76 and 77, respectively, which are provided on the first lens frame 40. Each of the magnet holding portions 76 and 77 is shaped as a flange which projects radially outwards from the lens holding portion 63. The support recesses 76*a* and 77*a* are bottomed holes which are open at the fronts of the magnet holding portions 76 and 77, respectively. The rear surfaces of the magnet holding portions 76 and 77 are shaped to superpose the front surfaces of the sensor support portions 55 and 56 of the base frame 41, respectively, when the first lens frame 40 and the base frame 41 are combined (see FIG. 7). The permanent magnets 71 and 72 are substantially identical in shape and size to each other. Each of the permanent magnets 71 and 72 is in the shape of a non-square rectangular plate. The permanent magnets 71 and 72 are arranged symmetrically with respect to the first imaginary plane P1. More specifically, opposite sides of a magnetic pole boundary line Q1 (see FIG. 5) of the permanent magnet 71, which extends in the lengthwise direction thereof and passes through an approximate center of the permanent magnet 71 with respect to the width thereof, are magnetized into north and south poles, respectively, while opposite sides of a magnetic pole boundary line Q2 (see FIG. 5) of the permanent magnet 72, which extends in the lengthwise direction thereof and passes through an approximate center of the permanent magnet 72 with respect to the width thereof, are magnetized into north and south poles, respectively. In other words, the magnetic pole boundary line Q1 defines a boundary between north and south poles of the permanent magnet 71, while the magnetic pole boundary line Q2 defines a boundary between north and south poles of the permanent magnet 72. The magnetic pole boundary line Q1 of the permanent magnet 71 and the magnetic pole boundary line Q2 of the permanent magnet 72 are inclined to each other so that the distance therebetween (i.e., the distance from the first imaginary plane P1) gradually increases in a direction from left to right. The inclination angles of the magnetic pole boundary lines Q1 and Q2 of the permanent magnets 71 and 72 with respect to the first imaginary plane P1 are set to approximately ±45 degrees, respectively. Namely, the lengthwise directions (the magnetic pole boundary lines Q1 and Q2) of the permanent magnets 71 and 72 are substantially orthogonal to each other. Since the set screws 54 which fix the base frame 41 to the housing 16 are positioned in the vicinity of the permanent magnets 71 and 72, each set screw 54 is made of a nonmetal such as resin or a nonmagnetic (magnetically non-attracted) metal so that the set screws 54 do not influence the anti-shake driving operation of the electromagnetic actuator.

The board module 13 is provided with the aforementioned circuit board 73. The circuit board 73 is provided with a planar portion (first planar portion) 79 made of a flat plate which is orthogonal to the forward/rearward direction. The front shape of the planar portion 79 of the circuit board 73 corresponds to the combined front shape of the accommodating recess 18 of the housing 16 and the first lens-group unit 12. A printed circuit is formed on the rear surface of the planar portion 79 of the circuit board 73 and is connected to a flexible wiring board FL which extends rightward from the circuit board 73. The image sensor IS is fixed to the rear of the planar portion 79 at a position near the right end thereof, and a plurality of terminals (not shown) provided on the image sensor IS are fixedly connected to the aforementioned printed circuit by soldering. The imaging surface of the image sensor IS faces rearwardly, and the entire imaging surface is covered by a cover glass. In FIG. 6, the image sensor IS and the cover glass are shown as a single body. The circuit board 73 is provided, in the vicinity of two diagonally opposite corners of the planar portion 79, with two circular holes 80, respectively. The circuit board 73 is further provided, in the vicinity of the left end of the planar portion 79, with a photographing aperture 81 which is formed through the planar portion 79 in the forward/rearward direction.

The coils 74 and 75, which constitute elements of the electromagnetic actuator, are fixed to the rear surface of the planar portion 79 of the circuit board 73 in the vicinity of the left end thereof. As shown in FIG. 4, each of the coils 74 and 75 is an air-core coil which includes a pair of linear portions that are substantially parallel to each other and a pair of curved (U-shaped) portions which connect the pair of elongated portions at the respective ends thereof. The coils 74 and 75 are substantially identical in shape and size to each other and are symmetrically arranged with respect to the first imaginary plane P1. Specifically, the coils 74 and 75 are arranged such that the long axis (major axis) R1 of the coil 74, which is parallel to the linear portions of the coil 74 and passes through the air core of the coil 74, and the long axis (major axis) R2 of the coil 75, which is parallel to the linear portions of the coil 75 and passes through the air core of the coil 75, are inclined to each other to correspond to the magnetic pole boundary line Q1 of the permanent magnet 71 and the magnetic pole boundary line Q2 of the permanent magnet 72, respectively, so that the distance between the long axis R1 and the long axis R2 gradually increases in a direction from left to right. The inclination angles of the major axes R1 and R2 of the coils 74 and 75 with respect to the first imaginary plane P1 are set to approximately ±45 degrees, respectively. Namely, the lengthwise directions (the major axes R1 and R2) of the coils 74 and 75 are substantially orthogonal to each other.

The circuit board 73 is further provided at the left end thereof with two sensor support arms 82 and 83 as portions of the flexible wiring board FL. Each of the two sensor support arms 82 and 83 is in the shape of a cantilever. The sensor support arm 82 is provided with an extension portion (connecting portion) 82a which extends rearward from the planar portion 79 and an opposed planar portion (second planar portion) 82b which is formed to extend substantially parallel to the planar portion 79 so as to be opposed to the planar portion 79 in the forward/rearward direction by bending a free end portion of the sensor support arm 82. Likewise, the sensor support arm 83 is provided with an extension portion (connecting portion) 83a which extends rearward from the planar portion 79 and an opposed planar portion (second planar portion) 83b which is formed to extend substantially parallel to the planar portion 79 so as to be opposed to the planar portion 79 in the forward/rearward direction by bending a free end portion of the sensor support arm 83. Namely, each of the sensor support arms 82 and 83 firstly projects rearward and subsequently bends inward to extend substantially parallel to the planar portion 79. A magnetic sensor (detecting member) 84 is fixedly mounted onto the front surface of the opposed planar portion 82b to face the rear of the coil 74, and a magnetic sensor (detecting member) 85 is fixedly mounted onto the front surface of the opposed planar portion 83b to face the rear of the coil 75.

The board module 13 is mounted to the body module 11 (the housing 16) to which the first lens-group unit 12 has been mounted. When the board module 13 is mounted to the body module 11, the front opening of the accommodating recess 18 is closed to make an outer peripheral portion of the rear surface of the planar portion 79 of the circuit board 73 come in surface contact with the board support surface 27 (accordingly, the front surfaces of the planar portion 79 of the circuit board 73 and the housing 16 substantially lie in a plane), with the two circular holes 80 of the circuit board 73 respectively fitted on the two engaging projections 28 of the housing 16. Thereupon, the image sensor IS (specifically the aforementioned cover glass that covers the imaging surface of the imaging sensor IS) comes into contact with the packing 23 as shown in FIG. 6, so that the periphery of the imaging surface of the image sensor IS is sealed up by the packing 23. The optical path between the exit surface L12-b of the second prism L12 and the image sensor IS is secured via the through-hole 24 of the packing 23. The first lens element L1 is exposed forward through the photographing aperture 81 of the circuit board 73, and the first lens frame 40 is prevented from coming forwardly off by a plate surface of the circuit board 73 (the planar portion 79) around the photographing aperture 81. In this state, the planar portion 79 and the opposed planar portions 82b and 83b of the circuit board 73 are each supported as a flat portion that is substantially orthogonal to the first optical axis O1.

In the above described mounted state of the board module 13 to the body module 11, the direction of the long axis R1 of the coil 74 is substantially parallel to the magnetic pole boundary line Q1 of the permanent magnet 71 and the direction of the long axis R2 of the coil 75 is substantially parallel to the magnetic pole boundary line Q2 of the permanent magnet 72. The coils 74 and 75 are connected to the aforementioned printed circuit that is formed on the rear surface of the planar portion 79 of the circuit board 73, and the energization of the coils 74 and 75 is controlled by a control circuit (not shown). A driving force is generated in a direction substantially orthogonal to the magnetic pole boundary line Q1 of the permanent magnet 71 (i.e., orthogonal to the direction of the long axis R1 of the coil 74) in a plane orthogonal to the first optical axis O1 upon the coil 74 being energized. The direction of action of this driving force is shown by a double-headed arrow F1 in FIGS. 4, 5 and 11. On the other hand, a driving force is generated in a direction substantially orthogonal to the magnetic pole boundary line Q2 of the permanent magnet 72 (i.e., orthogonal to the direction of the long axis R2 of the coil 75) in a plane orthogonal to the first optical axis O1 upon the coil 75 being energized. The direction of action of this driving force is shown by a double-headed arrow F2 in FIGS. 4, 5 and 11. Each of the directions of action F1 and F2 of the two aforementioned driving forces intersects both the X-axis direction and the Y-axis direction at an angle of approximately 45 degrees. With this structure, the first lens frame 40 can be moved to any arbitrary position in a plane orthogonal to the first optical axis O1 with respect to the base frame 41 (and the body module 11 and the board module 13 that are fixed with respect to the base frame 41) by controlling the passage of current through each of the coils 74 and 75. As described above, the moving range of the first lens frame 40 is limited by engagement of the inner walls of the two movement limit holes 70 with the two movement limit projections 60, respectively.

Reference characters 71u and 72u shown in FIG. 5 designate the centers of the permanent magnets 71 and 72 (the centers of the outer shapes thereof) in a plane orthogonal to the first optical axis O1, respectively, and reference characters 74u and 74u shown in FIG. 4 designate the centers of the coils 74 and 75 (the centers of the outer shapes thereof) in a plane orthogonal to the first optical axis O1, respectively. The center 71u of the permanent magnet 71 corresponds to both the center of the permanent magnet 71 in the lengthwise (long-side) direction of the permanent magnet 71 along the magnetic pole boundary line Q1 thereof and the center of the permanent magnet 71 in the short-side direction thereof that is orthogonal to the magnetic pole boundary line Q1. The center 72u of the permanent magnet 72 corresponds to both the center of the permanent magnet 72 in the lengthwise (long-side) direction of the permanent magnet 72 along the magnetic pole boundary line Q2 thereof and the center of the permanent magnet 72 in the short-side direction thereof that is orthogonal to the magnetic pole boundary line Q2. The center 74u of the coil 74 corresponds to both the center of the coil 74 in the lengthwise (long-side) direction thereof along the long axis R1 and the center of the coil 74 in the short-side direction thereof that is orthogonal to the long axis R1. The center 75u of the coil 75 corresponds to both the center of the coil 75 in the lengthwise (long-side) direction thereof along the long axis R2 and the center of the coil 75 in the short-side direction thereof that is orthogonal to the long axis R2. FIGS. 4 and 5 each show a state where the first lens frame 40 is positioned at the center of the moving range thereof, which is mechanically defined (limited) by the two movement limit projections 60 and the two movement limit holes 70. When the first lens frame 40 is positioned at the center of the moving range thereof, the center 71u of the permanent magnet 71 and the center 74u of the coil 74 are coincident with each other (i.e., the center 71u and the center 74u align in the forward/rearward direction), and the center 72u of the permanent magnet 72 and the center 75u of the coil 75 are coincident with each other (i.e., the center 72u and the center 75u align in the forward/rearward direction). A movement of the first lens frame 40 which is caused by the passage of current through the coils 74 and 75 causes the positions of the centers 71u and 72u of the permanent magnets 71 and 72 that are mounted on the first lens frame 40 to change, respectively.

Each of the two magnetic sensors 84 and 85 is composed of a magnetic sensor (Hall sensor) connected to the aforementioned printed circuit that is formed on the rear surface of the planar portion 79 of the circuit board 73. As shown in FIG. 7, when the board module 13 is mounted to the body module 11 and the first lens-group unit 12, the magnetic sensor 84 enters the sensor support portion 55 of the base frame 41 from the rear side to be positioned behind the permanent magnet 71, while the magnetic sensor 85 enters the magnetic sensor support portion 56 of the base frame 41 from rear to be positioned behind the permanent magnet 72. As viewed along the first optical axis O1, each of the two magnetic sensor 84 and 85 is substantially rectangular in shape, and the reference characters 84u and 85u shown in FIG. 11 designate the centers of the magnetic sensors 84 and 85 in a plane orthogonal to the first optical axis O1, respectively. As shown in FIG. 11, a straight line that passes through the center 84u of the magnetic sensor 84 and extends in the direction of action F1 of the driving force caused by the permanent magnet 71 and the coil 74 and a straight line that passes through the center 85u of the magnetic sensor 85 and extends in the direction of action F2 of the driving force caused by the permanent magnet 72 and the coil 75 intersect each other on the first optical axis O1. Due to this arrangement, variation in position of the permanent magnet 71 in accordance with movement of the first lens frame 40 that is caused by the electromagnetic actuator causes the output of the magnetic sensor 84 to vary, and variation in position of the permanent magnet 72 in accordance with movement of the first lens frame 40 that is caused by the electromagnetic actuator causes the output of the magnetic sensor 85 to vary. Hence, the position of the first lens frame 40 can be detected from the output variations of the two magnetic sensors 84 and 85.

Assembly of the imaging unit 10 is completed by fixing the front cover 14 and the rear cover 15 to the above described combination of the body module 11, the first lens-group unit 12 and the board module 13. Each of the front cover 14 and the rear cover 15 is a press-molded sheet metal product that is made of a nonmagnetic metal or a feeble magnetic metal so as to have no influence on the anti-shake driving operation of the electromagnetic actuator. The front cover 14 is integrally provided with a base 90, an upper and lower pair of engaging lugs 91, an upper and lower pair of engaging lugs 92 and an upper and lower pair of side engaging lugs 93. The base 90 is formed as a planar member orthogonal to the forward/rearward direction. The upper engaging lug 91 and the upper engaging lug 92 extend rearward from the upper edge of the base 90, and the lower engaging lug 91 and the lower engaging lug 92 extend rearward from the lower edge of the base 90. The pair of side engaging lugs 93 extend rearward from the right edge of the base 90. A rectangular engaging hole 91a, a rectangular engaging hole 92a and a rectangular engaging hole 93a are formed through each of the upper and lower engaging lugs 91, each of the upper and lower engaging lugs 92 and each of the side engaging lugs 93, respectively. The base 90 is provided at the right end thereof with three pressure leaves each of which is resiliently deformable in the forward/rearward direction. Each pressure leaf 94 in a free state lies in a plane in which the other part of the base 90 lies. Each pressure leaf 94 is provided in the vicinity of the free end thereof with a pressure projection 94a which projects rearward. The base 90 is provided in the vicinity of the left end thereof with a photographing aperture 95 which is formed therethrough in the forward/rearward direction.

The rear cover 15 is integrally provided with a base 100, an upper and lower pair of engaging lugs 101, an upper and lower pair of engaging lugs 102, a side engaging lug 103 and a support lug (retaining member) 104. The base 100 is formed as a planar member orthogonal to the forward/rearward direction. The upper engaging lug 101 and the upper engaging lug 102 extend forward from the upper edge of the base 100, and the lower engaging lug 101 and the lower engaging lug 102 extend forward from the lower edge of the base 100. The side engaging lug 103 extends forward from the right edge of the base 100, and the support lug 104 projects from the left end of the base 100. A rectangular engaging hole 101a is formed through each of the upper and lower engaging lugs 101, and a rectangular engaging hole 103a is formed through the side engaging lug 103. As shown in FIG. 7, the support lug 104 is provided with a base portion 105, a pair of upright walls 106 and a pair of sensor support walls 107. The base portion 105 is continuous with and projects leftward from the base 100, the pair of upright walls 106 project forward from the upper and lower ends of the base portion 105, respectively, and the pair of sensor support walls 107 extend vertically in opposite directions away from each other from the front edges of the pair of upright walls 106, respectively. An engaging hole 106a is formed through each upright wall 106. The base frame 41 that constitutes an element of the first lens-group unit 12 is provided with the aforementioned support protrusion 78. The support protrusion 78 projects rearward to be fit-engaged into a portion (recessed portion) of the support lug 104 which is surrounded by the base portion 105 and the pair of upright walls 106. The support protrusion 78 is provided on upper and lower sides thereof with two (upper and lower) engaging projections 78a, respectively, which are engaged with the engaging holes 106a of the pair of upright walls 106, respectively.

The front cover 14 is mounted to the front of the board module 13 with a rectangular light shielding sheet 108 held between the front cover 14 and the front of the board module 13. The light shielding sheet 108 can be omitted if sufficient light-tightness can be ensured without the light shielding sheet 108. The front cover 14 is fixed to the housing 16 by making the base 90 cover the circuit board 73 from front while engaging the upper and lower engaging lugs 91 with the upper and lower engaging recesses 29A of the housing 16, respectively, engaging the upper and lower engaging holes 91a of the upper and lower engaging lugs 91 with the upper and lower engaging projections 30 of the housing 16, respectively, and engaging the engaging holes 93a of the upper and lower side engaging lugs 93 with the upper and lower engaging projections 32 of the housing 16, respectively. Additionally, the front cover 14 is fixed to the base frame 41 by engaging the engaging holes 92a of the upper and lower engaging lugs 92 with the upper and lower engaging projections 46 of the base frame 41 while sliding the upper and lower engaging lugs 92 on the upper surface of the upper flange 44 and the lower surface of the lower flange 44, respectively. Upon the front cover 14 being fixed to the housing 16, the pressure projection 94a of each pressure leaf 94 comes into contact with a front surface of the planar portion 79 of the circuit board 73 and thereupon a rearward pressing force (biasing force) acts on the front surface of the planar portion 79 of the circuit board 73 from the pressure leaves 94 resiliently deformed slightly forwards, so that the circuit board 73 (the board module 13) is precisely positioned and held at a predetermined position in the forward/rearward direction relative to the housing 16 (the body module 11). The photographing aperture 95 that is formed in the front cover 14 is formed to correspond in position and shape to the photographing aperture 81 of the circuit board 73, so that the photographing aperture 95 is communicatively connected to the photographing aperture 81 and so that the first lens element L1 is exposed toward the front of the imaging unit 10 through the photographing apertures 81 and 95 in a state where the front cover 14 is mounted to the front of the board module 13.

The rear cover 15 is mounted to the rear sides of the body module 11 and the first lens-group unit 12. The rear cover 15 is fixed to the housing 16 by making the base 100 cover the rear side of the housing 16 while engaging each of the upper and lower engaging lugs 101 and each of the upper and lower engaging lugs 102 with the associated engaging recess 29B and the associated engaging recess 29C of the housing 16, respectively, engaging the engaging hole 101a of each engaging lug 101 with the associated engaging projection 31 of the housing 16, and engaging the engaging hole 103a of the side engaging lug 103 of the rear cover 15 with the engaging projection 33 (see FIG. 6) that is formed on the right side of the housing 16. Additionally, as shown in FIG. 7, the rear cover 15 is fixed to the base frame 41 by making the base 100 of the rear cover 15 cover the base frame 41 from the rear side while engaging the support protrusion 78 of the base frame 41 in the recessed portion of the support lug 104 of the rear cover 15 that is formed by the base portion 105 and the pair of upright walls 106, and engaging the upper and lower engaging projections 78a of the support protrusion 78 in the upper and lower engaging holes 106a, respectively. Thereupon, the pair of sensor support walls 107 face the rear surfaces of the opposed planar portions 82b and 83b of the sensor support arms 82 and 83 of the circuit board 73 to prevent the sensor support arms 82 and 83 from being deformed rearwardly. The upper and lower sensor support walls 107 are resiliently deformed to press the sensor support arms 82 and 83 lightly forward to hold the magnetic sensors 84 and 85 in the sensor support portions 55 and 56, respectively. With this structure, each of the magnetic sensors 84 and 85 is precisely held at a predetermined position.

If the imaging unit 10 that is completely assembled as described above is directed toward an object located in front of the imaging unit 10, light reflected by the object (light emanating from a photographic object) enters the first prism L11 through the incident surface L11-a after passing through the first lens element L1 and is reflected at an angle of 90 degrees by the reflecting surface L11-c of the first prism L11 and travels toward the exit surface L11-b. Subsequently, the reflected light that emerges from the exit surface L11-b of the first prism L11 enters the second prism L12 from the incident surface L12-a after passing through the lens elements L2 through L6, and is reflected at an angle of 90 degrees by the reflecting surface L12-c of the second prism L12 and travels toward the exit surface L12-b. Subsequently, the reflected light emerges from the exit surface L12-b and is captured (received) by the imaging surface of the image sensor IS.

A zooming operation of the imaging optical system is performed by moving the second lens group G2 (the fourth lens element L4 and the fifth lens element L5) and the third lens group G3 (the lens element L6) along the first rod 36 and the second rod 37 using the first motor M1 and the second motor M2. A focusing operation of the imaging optical system is performed by moving the third lens group G3 (the lens element L6) along the first rod 36 and the second rod 37 using the second motor M2. By performing these zooming and focusing operations, focused object images can be captured at selected angle of view. FIG. 12 shows different states of the imaging optical system set at the wide-angle extremity, an intermediate focal length, and the telephoto extremity. When a zooming operation is performed to change the focal length from the wide-angle extremity to the telephoto extremity, the positions of the first lens group G1, the second prism L12 and the image sensor IS do not vary while the distance (the distance in a direction along the second optical axis O2) between the first lens group G1 and the second lens group G2 progressively decreases. The distance (the distance in a direction along the second optical axis O2) between the second lens group G2 and the third lens group G3 increases from the wide-angle extremity to the intermediate focal length and decreases from the intermediate focal length to the telephoto extremity.

In the imaging unit 10, an anti-shake (image shake correction/image-stabilizing/shake reduction) operation is performed using the first lens element L1 of the first lens group G1 that is positioned in front of the first prism L11. As described above, the anti-shake system supports the first lens frame 40 in a manner to allow the first lens frame 40 to move relative to the base frame 41, which is fixed with respect to the housing 16, in a plane orthogonal to the first optical axis O1 and drives the first lens frame 40 using the electromagnetic actuator. As shown in FIG. 6, the first lens frame 40 is located on the front side of the imaging unit 10 in the vicinity of the left end thereof. Although the partition wall 19 and the flange support seat 50 of the housing 16 are arranged around the first lens frame 40, the housing 16 is formed to create a predetermined space (clearance) between the housing 16 and the first lens frame 40 to prevent the partition wall 19 and the flange support seat 50 from interfering with the first lens frame 40 even when the first lens frame 40 moves within the moving range defined by the anti-shake system. In addition, the incident surface of the first lens element L1 is substantially flush with the front surface of the base 90 of the front cover 14, with the lens holding portion 63 of the first lens frame 40 inserted into the photographing aperture 81 of the circuit board 73 and the photographing aperture 95 of the front cover 14 as shown in FIG. 6; however, the size of each photographing aperture 81 and 95 is also set so as not to interfere with the first lens frame 40 even when the first lens frame 40 moves within the moving range defined by the anti-shake system. Accordingly, the first lens frame 40 can reliably be made to perform an anti-shake operation without any interference from any other elements of the imaging unit 10.

The moving direction of the first lens element L1 during an anti-shake operation is orthogonal to the first optical axis O1. Accordingly, the first lens frame 40 which holds the first lens element L1 does not move in the forward/rearward direction that corresponds to the direction of the thickness of the imaging unit 10. In addition, the support mechanism (which includes the movement limit projections 60, the ball support holes 61, the ball contact surfaces 66, the guide balls 67 and the movement limit holes 70) and the driver (which includes the permanent magnets 71 and 72 and the coils 74 and 75) that are for moving the first lens frame 40 relative to the base frame 41 are arranged at positions about the first optical axis O1 which surround the first lens element L1, so that the installation space for the support mechanism and the driver is small with respect to the forward/rearward direction of the imaging unit 10. Accordingly, the selection of the first lens element L1 as an anti-shake optical element makes it possible to slim down the imaging unit 10 even though the imaging unit 10 is provided with an anti-shake system. For instance, assuming an anti-shake system which moves the second lens group G2 or the third lens group G3 in directions orthogonal to the second optical axis O2 to cancel out image shake, unlike the present embodiment, securing room for the second lens frame 34 or the third lens frame 35 and installing the driver for the second lens frame 34 or the third lens frame 35 requires a greater installation space for the anti-shake system in the housing 16 in the forward/rearward direction than in the case of the above described illustrated embodiment, thus increasing the thickness of the imaging unit 10.

The first lens element L1 supported by the first lens frame 40 does not need to be connected to the circuit board 73, unlike an electrical component such as the imaging sensor IS, so that the supporting structure for the first lens frame 40 does not become complicated by routing of a flexible wiring board, or a flexible wiring board does not exert resistance on the first lens element L1 during an anti-shake operation. For instance, unlike the present embodiment, if the anti-shake system were to move the image sensor IS in directions orthogonal to the third optical axis O3 to cancel out image shake, the image sensor IS and the circuit board 73 would be connected to each other via a flexible wiring board after the image sensor IS is supported by the circuit board 73. In this case, the flexible wiring board is required to have a sufficient length so as not to provide resistance to movement of the image sensor IS; however, there is not much space around the image sensor IS, so that the flexible wiring board would interfere with other members if the flexible wiring board is made long. If the image sensor IS and the circuit board 73 are spaced from each other in the forward/rearward direction in order to prevent this problem from occurring, this spacing conflicts with the slimming down of the imaging unit 10.

The selection of the first lens element L1 as an anti-shake optical element avoids the above described problems and makes it possible to achieve a simple anti-shake system which contributes to the slimming down of the imaging unit 10. Since only the first lens element L1 is driven during the anti-shake control, rather than the entire first lens group G1, there is the advantage of the moving parts of the anti-shake system being able to be provided in a compact manner and the driving load thereon can be small. In typical anti-shake systems, if only a part (e.g., one lens element) of a lens group is driven in directions orthogonal to the optical axis thereof, there is a possibility of aberrations in the imaging optical system increasing (thereby deteriorating the optical performance of the imaging optical system) and thus causing the imaging optical system to become impractical to use. In this connection, since the first prism L11 that functions only to reflect the incident light rays is disposed between the first lens element L1 and the second lens element L2 (that are optical elements having refractive powers) in the first lens group G1 in the present embodiment, the distance between the first lens element L1 and the second lens element L2 is great, so that an increase in aberration is reduced (deterioration of the optical performance of the imaging optical system is minimalized) even if the first lens element L1 is solely moved to perform anti-shake control. Accordingly, a satisfactory optical performance can be secured for an anti-shake operation even if the first lens element L1 and the second lens element L2, which are spaced far from each other in the optical axis direction with the first prism L11 positioned therebetween, are treated as different lens groups, even though the aberration is controlled over the entire first lens group G1, which extends from the first lens element L1 to the third lens element L3, as a part of a zoom lens system; hence, only the first lens element L1 is set as an optical element used for anti-shake operation in the present embodiment.

Unlike telescopic lens barrels in which the length in an optical axis direction (the distance between the image plane and the lens element closest to the object side) varies when a zooming operation or a barrel retracting operation is performed, the length of the optical path from the incident surface of the first lens element L1 to the image plane (the imaging surface of the image sensor IS) in the imaging unit 10 is constant at all times. Therefore, it is possible to embed the imaging unit 10 into a mobile electronic device and cover the front of the first lens element L1 with a protection glass or the like, and no practical problem arises even if the first lens element L1 of the optical system of the imaging unit 10, which is located closest to the object side, is driven to cancel out image shake.

Figure 13:
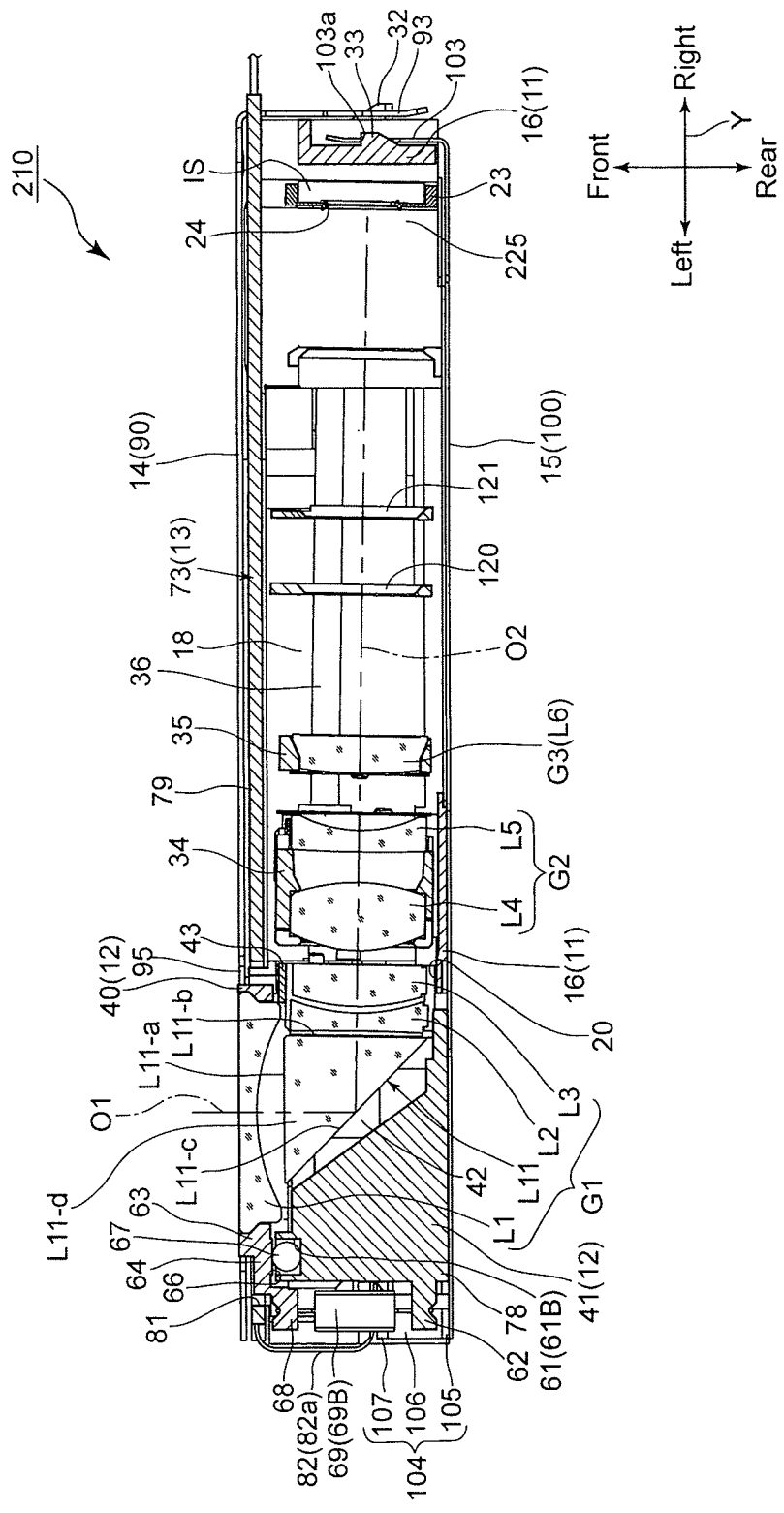
FIG. 13 is a view similar to that of FIG. 6 and illustrates another embodiment of the imaging unit according to the present invention, in which the imaging optical system does not have the second prism of the previous embodiment of the imaging unit.

The present invention can also be applied to a type of imaging optical system like an imaging unit 210 shown in FIG. 13 that does not included a reflector, such as a prism, between a movable lens group (the second lens group G2 and the third lens group G3) and the image sensor IS. In the imaging unit 210 shown in FIG. 13, a sensor support space 225 is formed at a position corresponding to the position at which the prism mounting recess 25 is formed in the previous embodiment of the imaging unit 10, and the image sensor IS is installed in the sensor support space 225 so that the imaging surface of the imaging sensor IS faces leftward. The image sensor IS lies on the second optical axis O2, and the light rays emerging from the third lens group G3 (the sixth lens element L6) are incident on the image sensor IS without being reflected. Also in the imaging unit 210 that includes such an L-shaped optical path, the above described effects are obtained by making the first lens element L1 serve as an anti-shake optical element. In the imaging unit 210 in particular, if the image sensor IS is made to serve as an anti-shake optical element, the possibility of the housing 16 increasing in size in the forward/rearward direction is great, similar to the case where the second lens group G2 or the third lens group G3 is made to serve as an anti-shake optical element. Accordingly, an anti-shake system in which the first lens element L1 is driven to reduce image shake is suitable for the imaging unit 210 from the standpoint of slimming down of the imaging unit 210 (reduction in size of the imaging unit 210 in the forward/rearward direction).

As mentioned above, even though only a part of a lens group is driven in the above described structure, in which the first lens element L1, which is an element of the first lens group LG1 and positioned in front of the first prism L11, is solely driven to reduce image shake, such a configuration does not easily influence the aberrations of the imaging optical system. However, since the first lens element L1 is required to have a higher operating accuracy than that of an anti-shake system in which an entire lens group is driven to reduce image shake, it is required to stabilize the anti-shake performance and the optical performance by precisely supporting and driving the first lens frame 40, which holds the first lens element L1. Additionally, in regard to the driving of the first lens element L1 to reduce image shake, which is the greatest in diameter among all the lens elements of the imaging optical system, it is required to make the anti-shake system as compact as possible so as to contribute to miniaturization of the imaging unit. Features of this anti-shake system will be described hereinafter.

The following descriptions are based on the premise that the imaging unit 10 (210) has a shape elongated in a direction along the second optical axis O2, and the first lens element L1 is positioned in the vicinity of one end of the imaging unit (210) in the lengthwise direction thereof. When four quadrants V1, V2, V3 and V4 which can be divided into four by the first imaginary plane P1 (which includes the first optical axis O1 and the second optical axis O2, on which the first lens element L1 lies, and extends in the lengthwise (long-side) direction of the imaging unit 10 (210) (the leftward/rightward direction)) and the second imaginary plane P2 (which includes the first optical axis O1, is orthogonal to the first imaginary plane P1 and extends in the short-side direction of the imaging unit 10 (210)) are set in a front view as shown in FIGS. 4 and 5, the first quadrant V1 and the fourth quadrant V4 are positioned on a side of the second imaginary plane P2 (the right side of the second imaginary plane P2 with respect to FIGS. 4 and 5) toward the light-ray travelling direction along the second optical axis O2 upon the light rays being reflected by the first prism L11, while the second quadrant V2 and the third quadrant V3 are positioned on the opposite side (the left side of the second imaginary plane P2 with respect to FIGS. 4 and 5) of the second imaginary plane P2 to the side of the first quadrant V1 and the fourth quadrant V4.

Out of the left-side section and the right-side section of the second imaginary plane P2, optical elements of the imaging optical system such as the second lens element L2, the third lens element L3, the second lens group G2, the third lens group G3 and the second prism L12 are arranged (along the second optical axis O2) in the right-side section (which includes the first quadrant V1 and the fourth quadrant V4) of the second imaginary plane P2. The first rod 36, the second rod 37, the driven nuts 38 and 39, the compression springs 122 and 123, the first motor M1 and the second motor M2, which constitute elements of the advancing/retracting drive mechanism for moving the second lens group G2 and the third lens group G3 along the second optical axis O2, are also arranged in the right-side section of the second imaginary plane P2.

On the other hand, the permanent magnets 71 and 72 and the coils 74 and 75, which constitute the electromagnetic actuator for driving the first lens element L1 to reduce image shake, and the magnetic sensors 84 and 85, which are for detecting the position of the first lens element L1 during driving thereof, are arranged in the second and third quadrants V2 and V3, which are positioned in the left-side section of the second imaginary plane P2 that is on the opposite side of the second imaginary plane P2, toward the light-ray travelling direction along the second optical axis O2. More specifically, the permanent magnet 71, the coil 74 and the magnetic sensor 84 are positioned in the second quadrant V2; the permanent magnet 72, the coil 75 and the magnetic sensor 85 are positioned in the third quadrant V3; and each of the elements in the second quadrant V2 and each of the elements in the third quadrant V3 are arranged to be substantially symmetrical with respect to the first imaginary plane P1. The permanent magnets 71 and 72 are arranged so that the inclination angles of the magnetic pole boundary lines Q1 and Q2 thereof with respect to the first imaginary plane P1 are approximately ±45 degrees, respectively, as described above, and the directions of inclination of the magnetic pole boundary lines Q1 and Q2 are set to approach the first imaginary plane P1 (so as to reduce the distance between the magnetic pole boundary lines Q1 and Q2) in the leftward direction away from the second imaginary plane P2. Likewise, the coils 74 and 75 are arranged so that the inclination angles of the long axis R1 and the long axis R2 thereof with respect to the first imaginary plane P1 become approximately ±45 degrees, respectively, and the directions of inclination of the long axes R1 and R2 are set to approach the first imaginary plane P1 (so as to reduce the distance between the long axis R1 and the long axis R2) in the leftward direction away from the second imaginary plane P2. In other words, the point of intersection between two straight lines respectively extending along the magnetic pole boundary lines Q1 and Q2 and the point of intersection between two straight lines respectively extending along the long axes R1 and R2 are positioned in the left-side section of the second imaginary plane P2, which is on the opposite side of the second imaginary plane P2 to that in which the second optical axis O2 extends.

The following effects are obtained by the above described arrangement of the permanent magnets 71 and 72 and the coils 74 and 75, which constitute elements of the anti-shake system for driving the first lens element L1. The arrangement of the electromagnetic actuator is not easily subjected to space restrictions because the second quadrant V2 and the third quadrant V3 are sections on the opposite side of the second imaginary plane P2 from the side toward the light-ray travelling direction along the second optical axis O2 and because none of the optical elements of the imaging optical system which are positioned optically rearward from the first prism L11 (rightward with respect to FIG. 6) are arranged in either the second quadrant V2 or the third quadrant V3. For instance, it is possible to drive the first lens element L1 even if a combination of the permanent magnet 71 and the coil 74 and a combination of the permanent magnet 72 and the coil 75 are arranged in the first quadrant V1 and the fourth quadrant V4, respectively, to be symmetrical with the above described (illustrated) arrangement with respect to the second imaginary plane P2. However, the second lens element L2 and the third lens element L3 are positioned in the first quadrant V1 and the fourth quadrant V4 at a position adjacent to the exit surface L11-b of the first prism L11, so that in this case there is a problem of it being difficult to secure space for installing the entire electromagnetic actuator without interfering with the second lens element L2 or the third lens element L3. Whereas, there is no such a restriction in the arrangement of (the illustrated embodiment in which) a combination of the permanent magnet 71 and the coil 74 provided in the second quadrant V2 and a combination of the permanent magnet 72 and the coil 75 provided in the third quadrant V3.

In general, to drive an object using voice coil motors, each of which includes a permanent magnet and a coil, two sets of permanent magnets and coils which have mutually different driving-force directions are used. The present embodiment of the imaging apparatus is provided with a combination of the permanent magnet 71 and the coil 74, the lengthwise (long-side) directions (the magnetic boundary line Q1 and the long axis R1) of which are parallel to each other, and a combination of the permanent magnet 72 and the coil 75, the lengthwise (long-side) directions (the magnetic boundary line Q2 and the long axis R2) of which are parallel to each other, and the direction of action F1 of the driving force generated by the former combination (71 and 74) and the direction of action F2 of the driving force generated by the latter combination (72 and 75) are orthogonal to each other. This arrangement makes it possible to move the first lens element L1 freely in a plane orthogonal to the first optical axis O1. In addition, the directions of inclination of the former combination (71 and 74) and the latter combination (72 and 75) are set so that the distance between the magnetic pole boundary lines Q1 and Q2 and the distance between the long axes R1 and R2 increase in the rightward direction (in which the second optical axis O2 extends) and so that the distance between the magnetic pole boundary lines Q1 and Q2 and the distance between the long axes R1 and R2 decrease in the opposite direction, i.e., the leftward direction. This arrangement makes it possible to accommodate the permanent magnet 71 and the coil 74 and the permanent magnet 72 and the coil 75 in the second quadrant V2 and the third quadrant V3 in the area that is peripheral to the lens holding portion 63 of the first lens frame 40, which is cylindrical in shape.

Just for the purpose of driving the first lens element L1, it is possible to make the directions of inclination of the permanent magnet 71 and the coil 74 and the permanent magnet 72 and the coil 75 with respect to the first imaginary plane P1 different from those in the above described embodiment. For instance, it is possible to drive the first lens element L1 in a plane orthogonal to the first optical axis O1 even if the magnetic pole boundary line Q1 and the long axis R1 are parallel to one of the imaginary planes P1 and P2 and the magnetic pole boundary line Q2 and the long axis R2 are parallel to the other imaginary plane P1 or P2. However, this arrangement causes at least one of a combination of the permanent magnet 71 and the coil 74 and a combination of the permanent magnet 72 and the coil 75 to enter the first quadrant V1 or the fourth quadrant V4 by a large amount, which deteriorates the aforementioned effect of using the second quadrant V2 and the third quadrant V3 that are subjected to less space restrictions. In addition, there is also a demerit of increasing in size of the anti-shake system in a direction along the first imaginary plane P1 because either a combination of the permanent magnet 71 and the coil 74 or a combination of the permanent magnet 72 and the coil 75 is positioned on the left-hand side of the first lens element L1 with respect to FIGS. 4 and 5.

In contrast, the anti-shake system can be installed in the second quadrant V2 and the third quadrant V3 in a space-efficient manner by setting the directions of inclination of the permanent magnets 71 and 72 and the coils 74 and 75 in a front view as shown in FIGS. 4 and 5 as described in the above illustrated embodiment. Although the inclination angles of the magnetic pole boundary lines Q1 and Q2 of the permanent magnets 71 and 72 with respect to the first imaginary plane P1 are set to approximately ±45 degrees, respectively, and the inclination angles of the major axes R1 and R2 of the coils 74 and 75 with respect to the first imaginary plane P1 are set to approximately ±45 degrees, respectively, in the above illustrated embodiment, the aforementioned effects of the space-saving design can also be obtained even if the inclination angles of the magnetic pole boundary lines Q1 and Q2 with respect to the first imaginary plane P1 and the inclination angles of the long axes R1 and R2 with respect to the first imaginary plane P1 are slightly changed. Specifically, if the inclination angles of the magnetic pole boundary lines Q1 and Q2 of the permanent magnets 71 and 72 with respect to the first imaginary plane P1 and the inclination angles of the long axes R1 and R2 of the coils 74 and 75 with respect to the first imaginary plane P1 are each set to within ±35 to 55 degrees, with the angle of the magnetic pole boundary lines Q1 and Q2 and the angle of the long axes R1 and R2 each maintained at 90 degrees, a space-saving arrangement of the anti-shake system is achieved.

Additionally, the second lens group G2 and the third lens group G3 that are movable along the second optical axis O2 are provided on an optical path extending from the first prism L11; the first motor M1 and the second motor M2 that respectively constitute drive systems of the second lens group G2 and the third lens group G3 contain metal parts; and the compression springs 122 and 123, the first rod 36 and the second rod 37 are also metal parts. If these metal parts are made of a magnetic material and are positioned near the electromagnetic actuator, there is a possibility of such metal parts exerting an influence on the anti-shake driving operation of the electromagnetic actuator. In the moving-magnet electromagnetic actuator of the present embodiment of the anti-shake system in particular, in which the permanent magnets 71 and 72 are supported on the moveable first lens frame 40, in order to make the electromagnetic actuator perform drive control with high precision, it is necessary to remove the influence caused by external magnetic materials on the magnetic fields of the permanent magnets 71 and 72. The permanent magnets 71 and 72 and the coils 74 and 75 that are arranged in the second quadrant V2 and the third quadrant V3 are farther from each motor M1 and M2, each rod 36 and 37 and each compression spring 122 and 123 than in the case where the permanent magnets 71 and 72 and the coils 74 and 75 were to be arranged in the first quadrant V1 and the fourth quadrant V4; therefore, the influence of these parts of the electromagnetic actuator does not easily reach the driving of the electromagnetic actuator even when these parts contain magnetic metal. In addition, the aforementioned selection of a nonmagnetic material such as resin or a nonmagnetic metal as the material of each set screw 54, for fixing the base frame 41 to the housing 16, and the aforementioned forming of each of the front cover 14 and the rear cover 15 from a nonmagnetic metal or a feebly-magnetic metal also contribute to high-precision drive control of the electromagnetic actuator.

As described above, the anti-shake system which is superior in space utilization and driving performance is obtained by installing the permanent magnets 71 and 72 and the coils 74 and 75 in the sections (the second quadrant V2 and the third quadrant V3) on the opposite side of the second imaginary plane P2 from the side toward the light-ray travelling direction along the second optical axis O2, and the arrangement of the permanent magnets 71 and 72 and the coils 74 and 75 so that the distance between the magnetic pole boundary lines Q1 and Q2 and the distance between the long axes R1 and R2 decrease in the direction opposite to the direction of extension of the second optical axis O2 in the arrangement of the anti-shake system for driving the first lens element L1.

Figure 22:
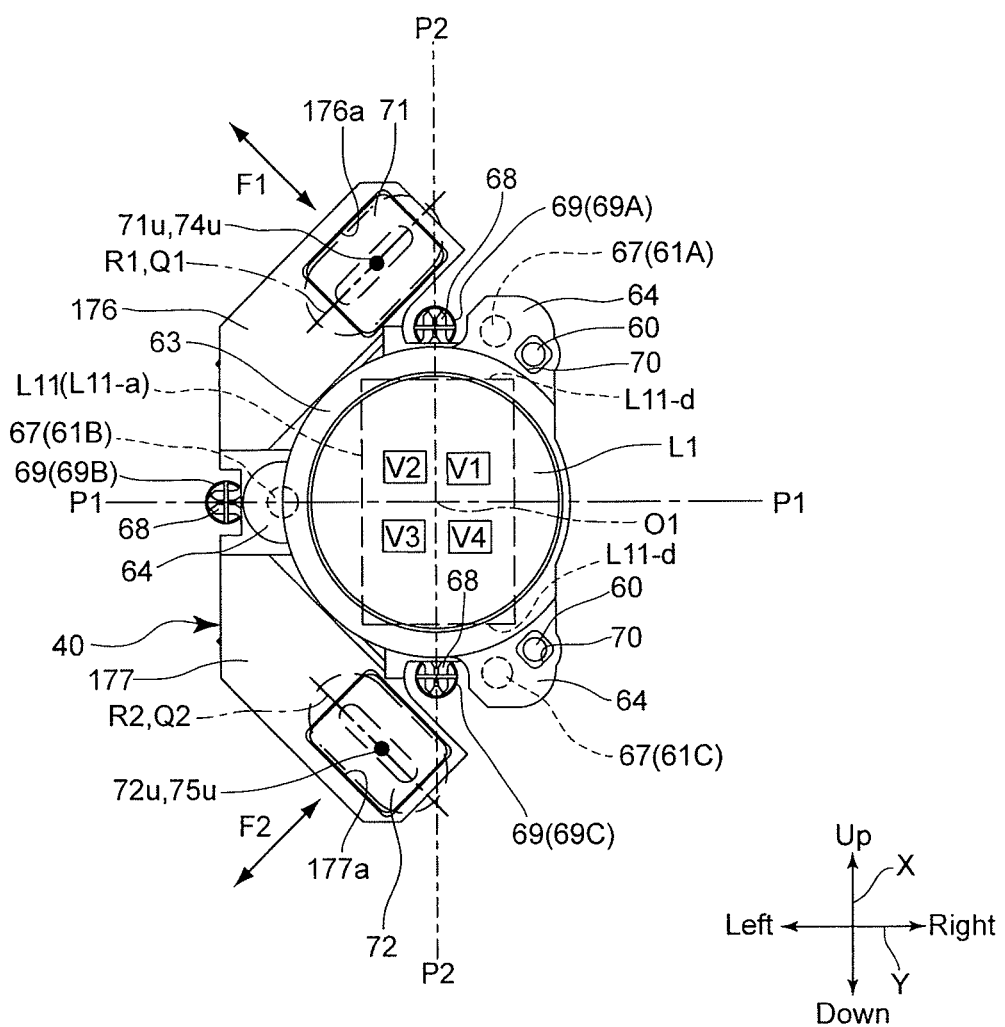
FIG. 22 is a front elevational view of the first lens frame and associated elements of another embodiment of the imaging unit, wherein the arrangement of the permanent magnets and the coils that constitute elements of the anti-shake system is different from that in each of the previous embodiments of the imaging unit.

Although the permanent magnets 71 and 72 and the coils 74 and 75 are entirely arranged in the second quadrant V2 and the third quadrant V3 in the above illustrated embodiment of the imaging apparatus, the permanent magnets 71 and 72 and the coils 74 and 75 can be alternatively arranged so as to partly project into the first and fourth quadrants V1 and V4 beyond the second imaginary plane P2 as shown in FIG. 22. In this case, as a condition for obtaining the aforementioned effects for space utilization and drive performance of the anti-shake system, it is desirable that at least the centers 71u and 72u of the permanent magnets 71 and 72 and the centers 74u and 75u of the coils 74 and 75 be positioned on the left-hand side of the second imaginary plane P2, i.e., within the second quadrant V2 and the third quadrant V3, respectively. Although the first lens frame 40 shown in FIG. 22 is identical in shape to that in the previous embodiment of the imaging apparatus except that magnet holding portions (movable element holding portions) 176 and 177 of the first lens frame 40 shown in FIG. 22 (which respectively correspond to the magnet holding portions 76 and 77 of the first lens frame 40 of the previous embodiment of the imaging apparatus) have a shape extended rightward to partly enter the first quadrant V1 and the fourth quadrant V4, respectively, it is possible to miniaturize the first lens frame 40 shown in FIG. 22 by removing portions of the magnet holding portions 176 and 177 on the left-hand side of the support recesses 176a and 177a thereof (which respectively correspond to the support recesses 76a and 77a of the first lens frame 40 of the previous embodiment of the imaging apparatus).

Additionally, the slimming of the anti-shake system in the forward/rearward direction (depthwise direction) of the imaging unit 10 (210) has been achieved. The permanent magnets 71 and 72, which constitute elements of drive sources of the anti-shake system, are fixed to the support recesses 76a and 77a of the magnet holding portions 76 and 77 of the first lens frame 40, respectively. The magnet holding portions 76 and 77 are flange portions which project sideways from the lens holding portion 63, which is cylindrical in shape and holds the first lens element L1, and the magnet holding portions 76 and 77 are positioned rearward from the position at which the first lens element L1 is supported by the lens holding portion 63 in a direction along the first optical axis O1 (i.e., in the forward/rearward direction; see FIG. 6). Consequently, in the forward/rearward direction, the positions of the permanent magnets 71 and 72, which are respectively supported by the magnet holding portions 76 and 77, are set to correspond to the position of the first prism L11 that is positioned behind the first lens element L1 (i.e., set within a space on the left-hand side of the first prism L11). In other words, the permanent magnets 71 and 72 are positioned within the range of the thickness of the first prism L11 in a direction along the first optical axis O1 (i.e., in the forward/rearward direction).

The coils 74 and 75, which constitute, together with the permanent magnets 71 and 72, drive sources of the anti-shake system, and the magnetic sensors 84 and 85, which detect the position of the first lens element L1, are supported by the circuit board 73. Although the major part of the planar portion 79 of the circuit board 73 is supported by the housing 16 of the body module 11, a portion of the planar portion 79 of the circuit board 73 in the vicinity of the left end thereof which supports the coils 74 and 75 is in contact with and supported by the front surfaces of the pair of flanges 44 and the pair of outer walls 49, so that the positions of the coils 74 and are determined with reference to the base frame 41. Additionally, the positions of the magnetic sensors 84 and 85, which are supported by the opposed planar portion 82b and 83b of the sensor support arms 82 and 83, are fixed by being fitted into the sensor support portions 55 and 56 of the base frame 41, respectively. Similar to the permanent magnets 71 and 72, the magnetic sensors 84 and 85 which are positioned via the base frame 41 are held at positions corresponding to the position of the first prism L11, which is positioned behind the first lens element L1, in the forward/rearward direction (within the range of the thickness of the first prism L11 in a direction along the first optical axis O1). The coils 74 and 75 which are positioned via the base frame 41 are held at positions overlapping the first lens element L1 and the first prism L11 in the forward/rearward direction. Alternatively, the entire coils 74 and 75 can be arranged at positions within the range of the thickness of the first prism L11 in the forward/rearward direction, similar to the permanent magnets 71 and 72 and the magnetic sensors 84 and 85.

As shown in FIGS. 6, 12 and 13, the first prism L11 is greater in thickness than the first lens element L1 in the forward/rearward direction along the first optical axis O1. None of the optical elements of the imaging optical system which are positioned optically rearward from the second lens element L2 are arranged in either the second quadrant V2 or the third quadrant V3, which is positioned on the opposite side of the second imaginary plane P2 from the side on which light rays which are reflected by the first prism L11 travel along the second optical axis O2, in the area around the first prism L11. Accordingly, in the area lateral to the first prism L11 in the second quadrant V2 and the third quadrant V3, a space corresponding to the thickness of the first prism L11 can be easily secured. In this space lateral to the first prism L11, the permanent magnets 71 and 72 and the coils 74 and 75 are arranged so that the permanent magnet 71 and the coil 74 superpose each other in the forward/rearward direction and so that the permanent magnet 72 and the coil 75 superpose each other in the forward/rearward direction (see FIG. 7), and accordingly, the electromagnetic actuator can be installed in a space-efficient manner in the forward/rearward direction, which contributes to slimming of the imaging unit 10 (210).

In a bending optical system such as the imaging unit 10 (210), the relative position between a reflector which changes the direction of the optical path and associated optical elements is extremely important. Accordingly, the base frame 41, which holds the first prism L11 that is a reflector in the first lens group G1, is made with precision. In addition, since the distance between the incident surface L11-*a* of the first prism L11 and the first lens L1 that is driven to reduce image shake is extremely small as shown in FIGS. 6 and 13, the base frame 41 is formed with high precision from the viewpoint of preventing interference between the first lens element L1 and the first prism L11. Additionally, since the base frame 41 has many wall portions around the prism mounting recess 42 compared with the box-shaped housing 16 (the inside of which is generally hollow) and is smaller in size than the housing 16, strength and accuracy are easily secured. In the imaging unit 10 (210), since the elements of the anti-shake system are positioned with reference to the base frame 41 that is superior in dimensional accuracy as described above, excellent effects are obtained in positional accuracy and driving accuracy of the anti-shake system.

More specifically, the positioning of the coils 74 and 75 is achieved by the contact and support of a portion of the planar portion 79 of the circuit board 73 in the vicinity of the left end thereof with and by the front surfaces of the pair of flanges 44 and the pair of outer walls 49, thereby achieving a high-precision position control of the coils 74 and 75 via the base frame 41. The positioning of the magnetic sensors 84 and 85 is achieved by the contact and support of the opposed planar portions 82*b* and 83*b* of the sensor support arms 82 and 83 with and by the rear surfaces of portions of the base frame 41 around the sensor support portions 55 and 56 and by engagement of the magnetic sensors 84 and 85 themselves in the sensor support portions 55 and 56, thereby achieving a high-precision position control of the magnetic sensors 84 and 85 via the base frame 41. In addition, since the opposed planar portions 82*b* and 83*b* of the sensor support arms 82 and 83 are pressed from behind by the pair of sensor support walls 107 (the support lug 104) of the rear cover 15, it is possible to make the sensor support arms 82 and 83 supported by the base frame 41 even though each of the two sensor support arms 82 and 83 is in the shape of a cantilever that extends from the planar portion 79. Additionally, the positions of the permanent magnets 71 and 72 are controlled by engagement of the first lens frame 40 (which includes the magnet holding portions 76 and 77) with the base frame 41 (with the three guide balls 67 held between the ball contact surfaces 66 and the bottom surfaces of the ball support holes 61 to reduce resistance to movement of the first lens frame 40) while being subjected to the biasing force of the three extension springs 69, so that the positioning accuracy of the permanent magnets 71 and 72 is higher than the case where the first lens frame 40 is supported by a member other than the base frame 41. Although the permanent magnets 71 and 72 are supported by the first lens frame 40 that is movable in the above illustrated embodiment of the imaging apparatus, the present invention can also be applied to an anti-shake system equipped with a moving-coil electromagnetic actuator in which the coils 74 and 75 are supported on the first lens frame 40 and the permanent magnets 71 and 72 are supported on the base frame 41. In this type of anti-shake system also, similar effects can be obtained by using the base frame 41 as a reference for the positioning of each element of the anti-shake system.

The first lens frame 40, which holds the first lens element L1 that is driven to reduce image shake, is supported while being subjected to the biasing force of the three extension springs 69 with the three guide balls 67 held between the first lens frame 40 and the base frame 41. In the case of spring-biasing a movable member which is circular in outer shape like the first lens element L1, it is conceivable for at least three springs to be arranged around the movable member at regular intervals (equi-angular intervals) as a structure for exerting spring biasing force uniformly impartially on the movable member. However, in the imaging unit 10 (210), the arrangement of the extension springs 69 is subjected to space restrictions because the optical elements of the imaging optical system which are positioned optically rearward from the first prism L11 are arranged on the side (the first quadrant V1 and the fourth quadrant V4) toward the light-ray travelling direction along the second optical axis O2 as mentioned above. If attempts are made to arrange an extension spring 69 at a position along the exit surface L11-*b* of the first prism L11 (along the exit long-side of the incident surface L11-*a*), there is a possibility of the extension spring 69 interfering with the second lens element L2, the third lens element L3 or the holding portions therefor. Furthermore, since the member which supports the first lens frame 40 in a manner to allow the first lens frame 40 to move is the base frame 41, which holds the first prism L11 that includes the incident surface L11-*a* having the shape of a rectangle, if the three extension springs 69 are arranged at intervals of 120 degrees (i.e., equi-angular intervals) about the first optical axis O1, the arrangement of the three extension springs 69 becomes unbalanced with respect to the base frame 41, so that anti-shake performance and optical performance may not be stable. Additionally, positions on the base frame 41 where the spring hook projections 62 can be formed exist outside the prism mounting recess 42 that holds the first prism L11; however, if the spring hook projections 62 are provided to be spaced from one another in the directions of the diagonal lines of the rectangular incident surface L11-*a* of the first prism L11, the anti-shake system becomes inferior in space utilization, which may increase the size of the base frame 41.

As shown in FIGS. 4 and 5, in the imaging unit 10 (210), the three extension springs 69 are arranged around the first lens frame 40 at predetermined intervals about the first optical axis O1; more specifically, two of the three extension springs 69 are the extension springs 69A and 69C that are provided on the second imaginary plane P2 and positioned on the opposite sides of the first lens frame 40, and the remaining extension spring 69 is the extension spring 69B that is provided on the first imaginary plane P1 and positioned on the opposite side of the first lens frame 40 from the side on which the second optical axis O2 extends. The extension springs 69A and 69C are positioned on the opposite sides of the pair of short sides (the pair of side surfaces L11-*d*) of the incident surface L11-*a* of the first prism L11. The extension spring 69A is positioned on the boundary between the first quadrant V1 and the second quadrant V2 and the extension spring 69C is positioned on the boundary between the third quadrant V3 and the fourth quadrant V4. The extension spring 69B is positioned on the boundary between the second quadrant V2 and the third quadrant V3 at a position along the end long-side of the incident surface L11-a.

By arranging the three extension springs 69 at positions along three of the four sides of the incident surface L11-a, respectively, except the exit long-side thereof which is adjacent to the exit surface L11-b side, it is possible to achieve a spring-biasing structure which is superior in space utilization and balance of the biasing force while avoiding the various above-mentioned problems. The extension springs 69 can be installed without interfering with optical elements on the second optical axis O2 such as the second lens element L2 and the third lens element L3 by excluding the position along the exit long-side of the incident surface L11-a (i.e., the exit surface L11-b) of the first prism L11 from the selection of installation positions of the three extension springs 69. In addition, a balanced biasing force can be applied to the first lens frame 40 by installing the two extension springs 69A and 69C at positions spaced from each other in the direction of the long sides of the incident surface L11-a (so as to be positioned along the pair of side surfaces L11-d, respectively). Specifically, the biasing force in the leftward/rightward direction is well-balanced by the positioning of each of the extension springs 69A and 69C at a position substantially corresponding to the center of the incident surface L11-a of the first prism L11 in the short-side direction thereof. Additionally, the biasing force in the upward/downward direction is also well-balanced since in the long-side direction of the incident surface L11-a of the first prism L11, the distance between the first optical axis O1 and the extension spring 69A and the distance between the first optical axis O1 and the extension spring 69C are made substantially the same as each other. The first lens frame 40 is supported by the base frame 41 via the three guide balls 67, and the center of a straight line which connects the extension spring 69A and the extension spring 69C in a plane orthogonal to the first optical axis O1 (the aforementioned straight line lies in the second imaginary plane P2 in the present embodiment, and the aforementioned center of this straight line is substantially coincident with the first optical axis O1 in the present embodiment) is positioned within the triangular area surrounded by the three guide balls 67. With this configuration, the biasing force of the extension springs 69A and 69C acts on the three guide balls 67 in a well-balanced manner, which achieves high-precision support for the first lens frame 40 and smooth sliding thereof. In addition, the stability of support for the first lens frame 40 can further be enhanced by the installation of the third extension spring 69B at a position along the end long-side of the incident surface L11-a of the first prism L11. Additionally, the arrangement of the extension springs 69 at positions along the pair of side surfaces L11-d and the end long-side of the incident surface L11-a makes it easier to position the spring hook projections 62 close to the first optical axis O1 than the case where the extension springs 69 are arranged to be spaced from one another in the directions of the diagonal lines of the incident surface L11-a of the first prism L11, thus contributing to miniaturization of the base frame 41. In the present embodiment of the imaging unit 10 (210), the permanent magnet 71, the coil 74 and the magnetic sensor 84 are provided on the second quadrant V2, while the lower movement limit projection 60 and the lower moving limit hole 70 are provided on the fourth quadrant V4, so as to be spaced from each other in the direction of the diagonal line of the incident surface L11-a of the first prism L11. Similarly, the permanent magnet 72, the coil 75 and the magnetic sensor 85 are provided on the third quadrant V3, while the upper movement limit projection 60 and the upper moving limit hole 70 are provided on the first quadrant V1, so as to be spaced from each other in the direction of the diagonal line of the incident surface L11-a of the first prism L11. From the viewpoint of enhancing the utilization of arrangement space in connection with these elements of the anti-shake system, the above-described arrangement of the three extension springs 69A, 69B and 69C is particularly effective.

The first lens element L1 is installed near the first prism L11 at a position facing the incident surface L11-a, and the second lens element L2 and the third lens element L3 are installed at a position facing the exit surface L11-b; however, none of the other optical elements of the imaging optical system are installed in any areas facing the other surfaces of the first prism L11. The extension springs 69A and 69C, which are respectively provided at positions along the pair of side surfaces L11-d of the incident surface L11-a of the first prism L11, and the extension spring 60B, which is provided at a position along the end long-side of the incident surface L11-a of the first prism L11, are all positioned in areas not subjected to restrictions by other optical elements. Accordingly, there are few restrictions on the length of the extension springs 69; the sizes of the extension springs 69 only need to satisfy the condition of being such that the extension springs 69 are able to be accommodated within the thickness of the imaging unit 10 (210) (in the forward/rearward direction). In other words, there is also the merit of each extension spring 69 having high in degree of freedom in the spring constant setting.

Other embodiments of the imaging unit that have the same features as the above illustrated embodiment of the imaging unit 10 (210) will be hereinafter discussed with reference to the drawings as from FIG. 14.

Figure 14:
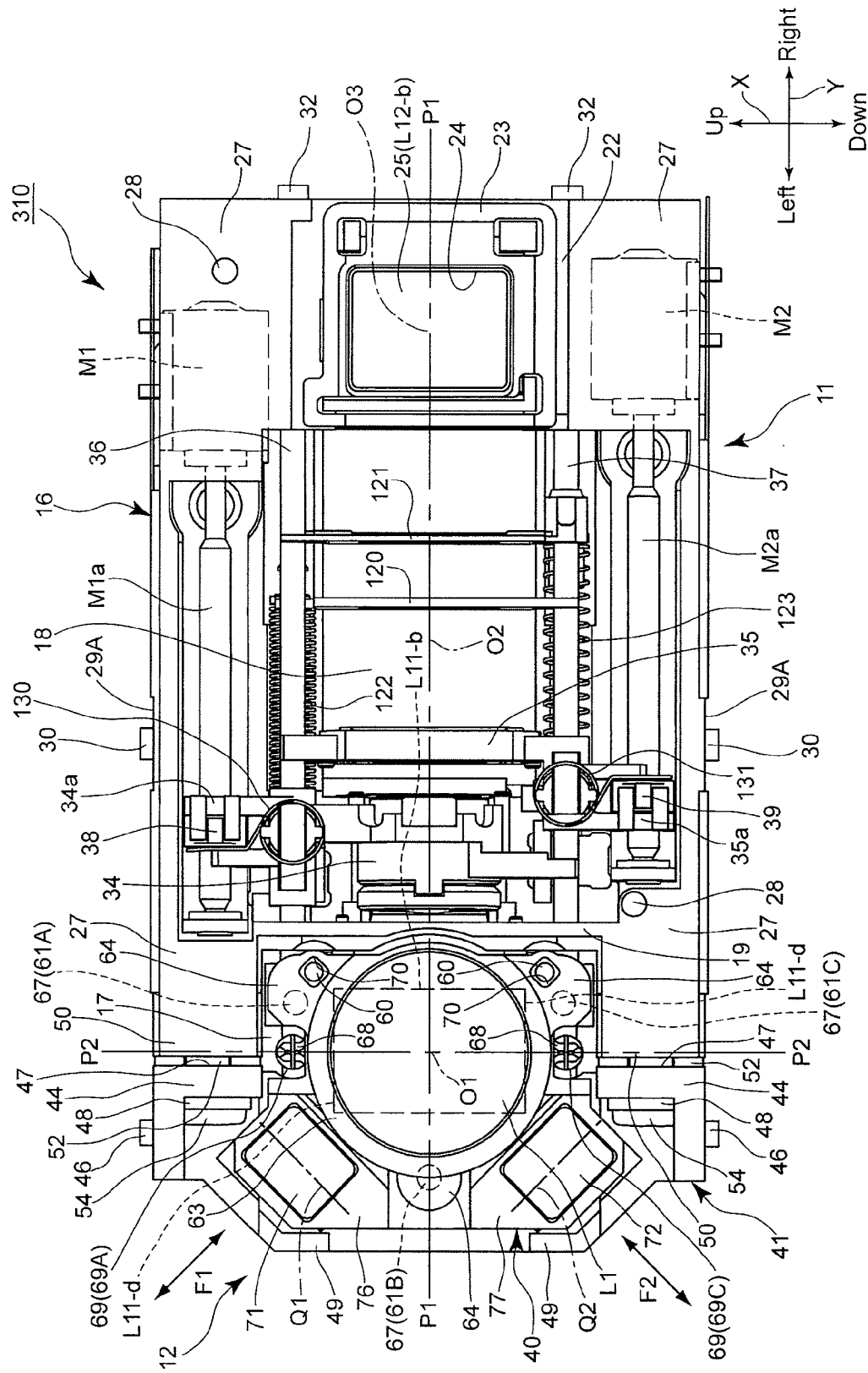
FIG. 14 is a view similar to that of FIG. 5 and illustrates still another embodiment of the imaging unit according to the present invention, from which the front cover and the board module are removed, wherein the number of extension springs for biasing a first lens frame for a first lens element of the imaging optical system of the imaging unit is different from that in each of the previous embodiments of the imaging unit.

FIG. 14 shows an imaging unit 310 as another embodiment of the imaging apparatus. The imaging unit 310 is provided, at positions along the pair of side surfaces L11-d the first prism L11, with the pair of extension springs 69A and 69C and is not provided with the extension spring 69B of the previous embodiment of the imaging unit 10 (210). The pair of extension springs 69A and 69C are installed to be spaced from each other in the lengthwise direction of the incident surface L11-a of the first prism L11 and to be substantially symmetrical with respect to the first optical axis O1. In addition, each of the extension springs 69A and 69C is positioned at a position substantially coincident with the center of the incident surface L11-a of the first prism L11 in the short-side direction (leftward/rightward direction) thereof. This arrangement of the pair of extension springs 69A and 69C makes it possible to exert biasing force uniformly on the first lens frame 40 on both sides of the first imaginary plane P1 and to hold the first lens frame 40 without causing the first lens frame 40 to incline or tilt even though the extension spring 69B of the imaging unit 10 (210) of the above-described embodiment is omitted from the imaging unit 310. Hence, the reduced number of extension springs 69 produces an effect of miniaturizing the anti-shake system. Additionally, no support for the extension spring 69B is required, which contributes to simplification of the structures of the first lens frame 40 and the base frame 41.

The structure from which the extension spring 69B is omitted is suitable also for the anti-shake system shown in FIG. 22. In the anti-shake system shown in FIG. 22, the projecting amounts of the permanent magnets 71 and 72 and the coils 74 and 75 into the second quadrant V2 and the third quadrant V3 in directions away from the second imaginary plane P2 have been reduced to small amounts. Additionally, in the second quadrant V2 and the third quadrant V3, the omission of the extension spring 69B, which is distant from the second imaginary plane P2, further reduces the space occupied by the anti-shake system in the second quadrant V2 and the third quadrant V3, thus making it possible to achieve further miniaturization of the anti-shake system in a direction along the second optical axis O2.

Figure 15:
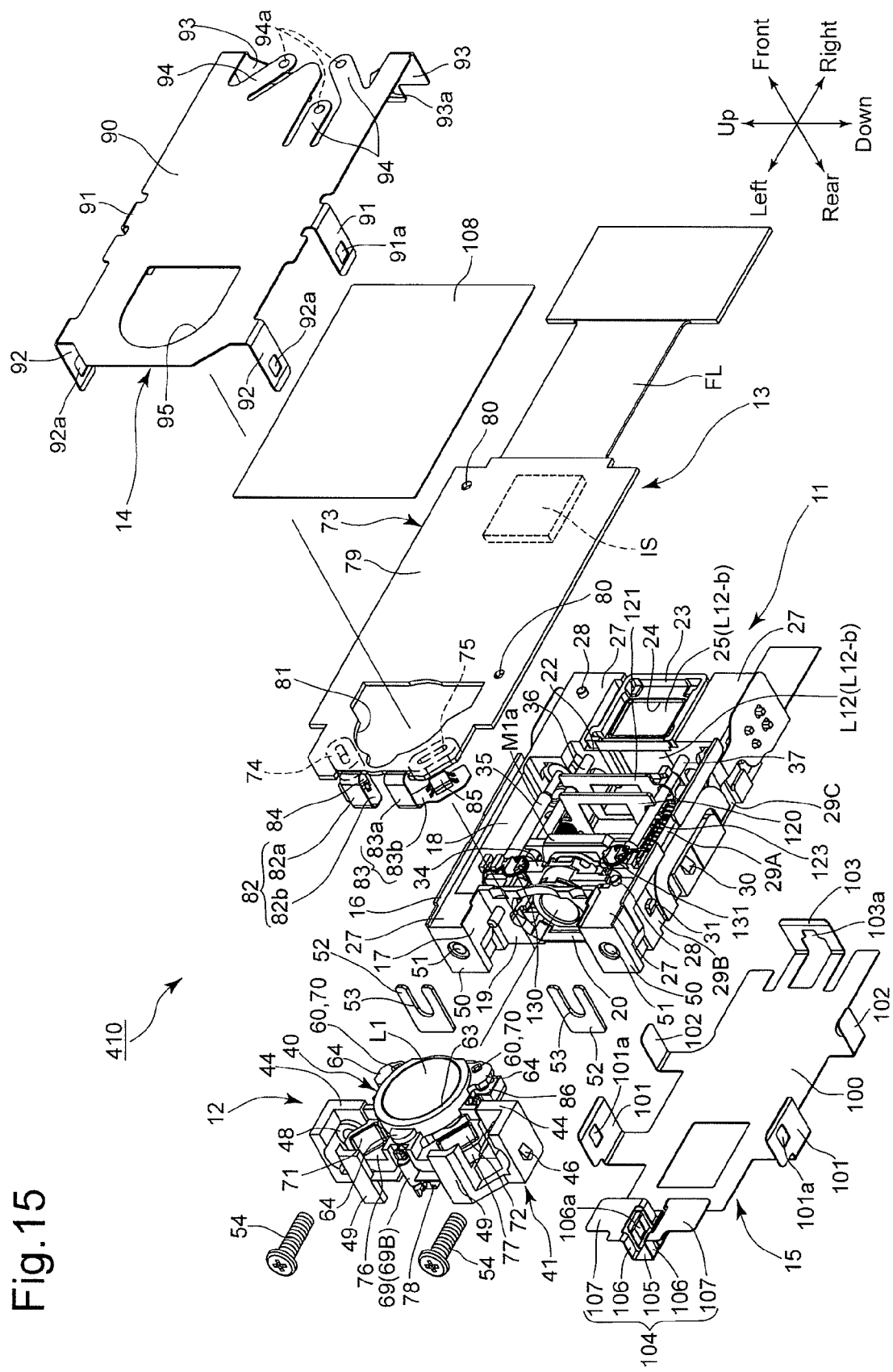
FIG. 15 is a view similar to that of FIG. 2 and illustrates still another embodiment of the imaging unit according to the present invention, wherein the mechanism which supports the first lens frame in a manner to allow the first lens frame to move is different from that provided in each of the previous embodiments of the imaging unit.
Figure 16:
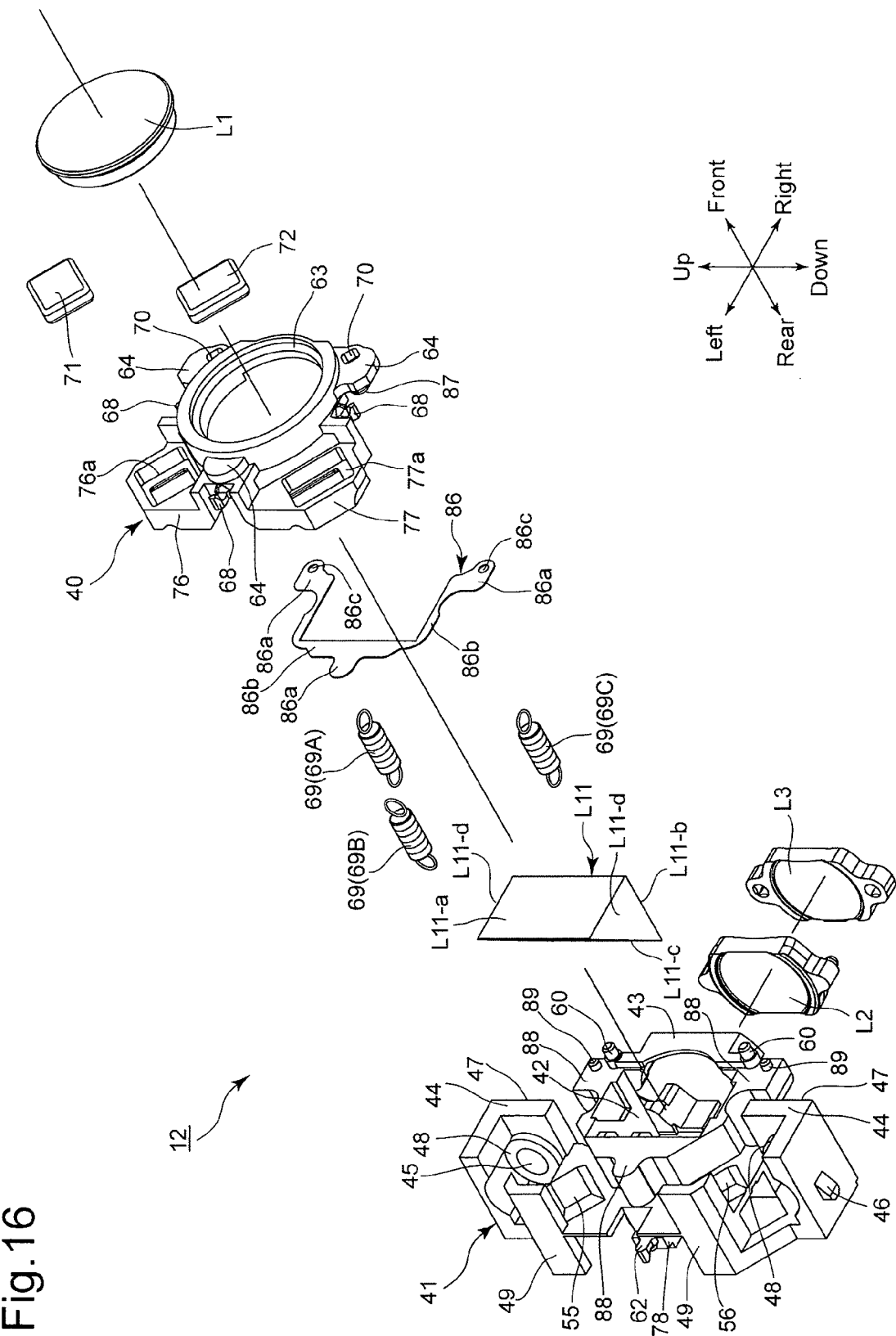
FIG. 16 is an exploded perspective view of the first lens-group unit of the imaging unit shown in FIG. 15.
Figure 17:
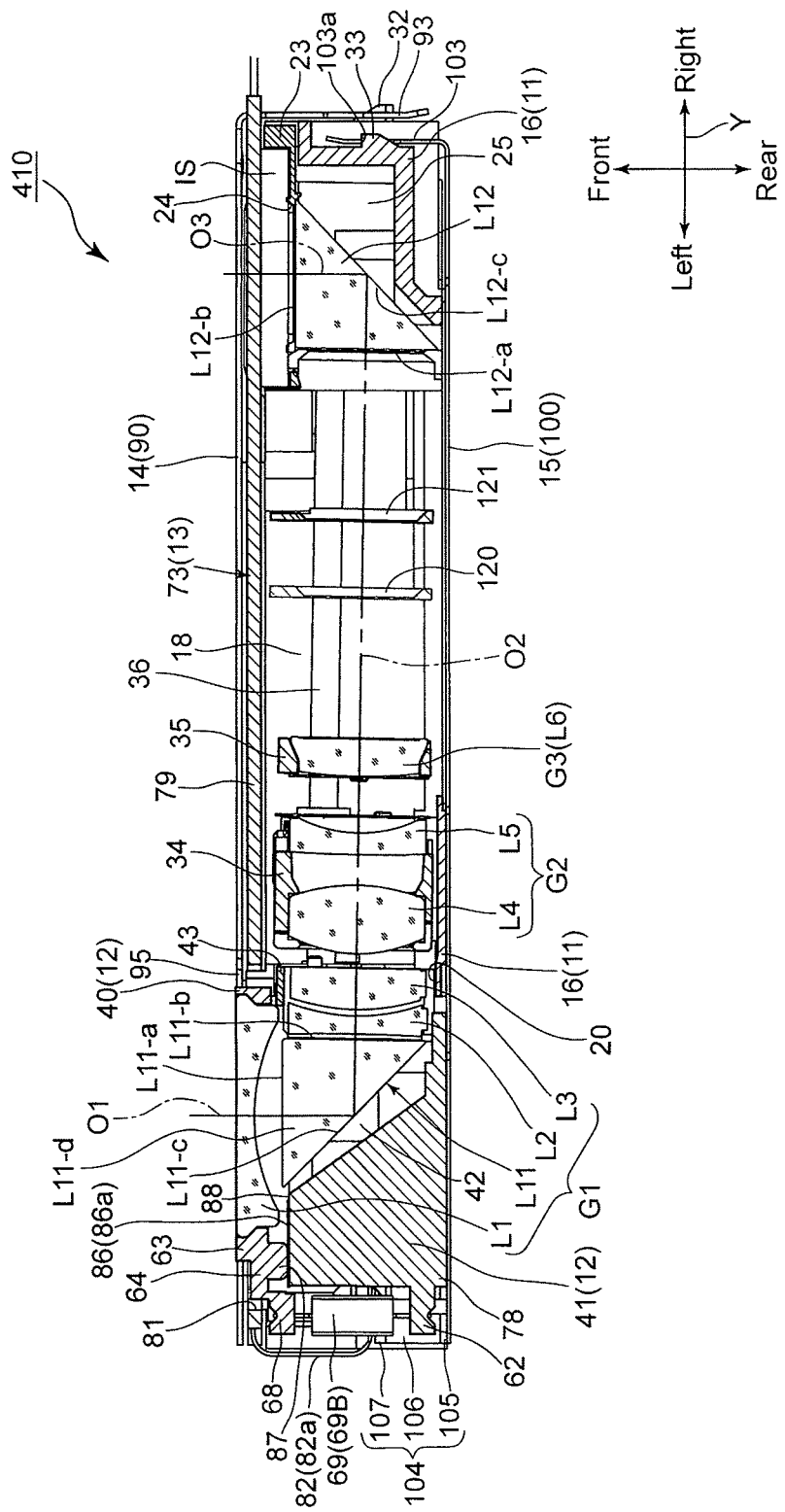
FIG. 17 is a cross sectional view of the imaging unit shown in FIG. 15, taken along a first imaginary plane (second optical axis)
Figure 18:
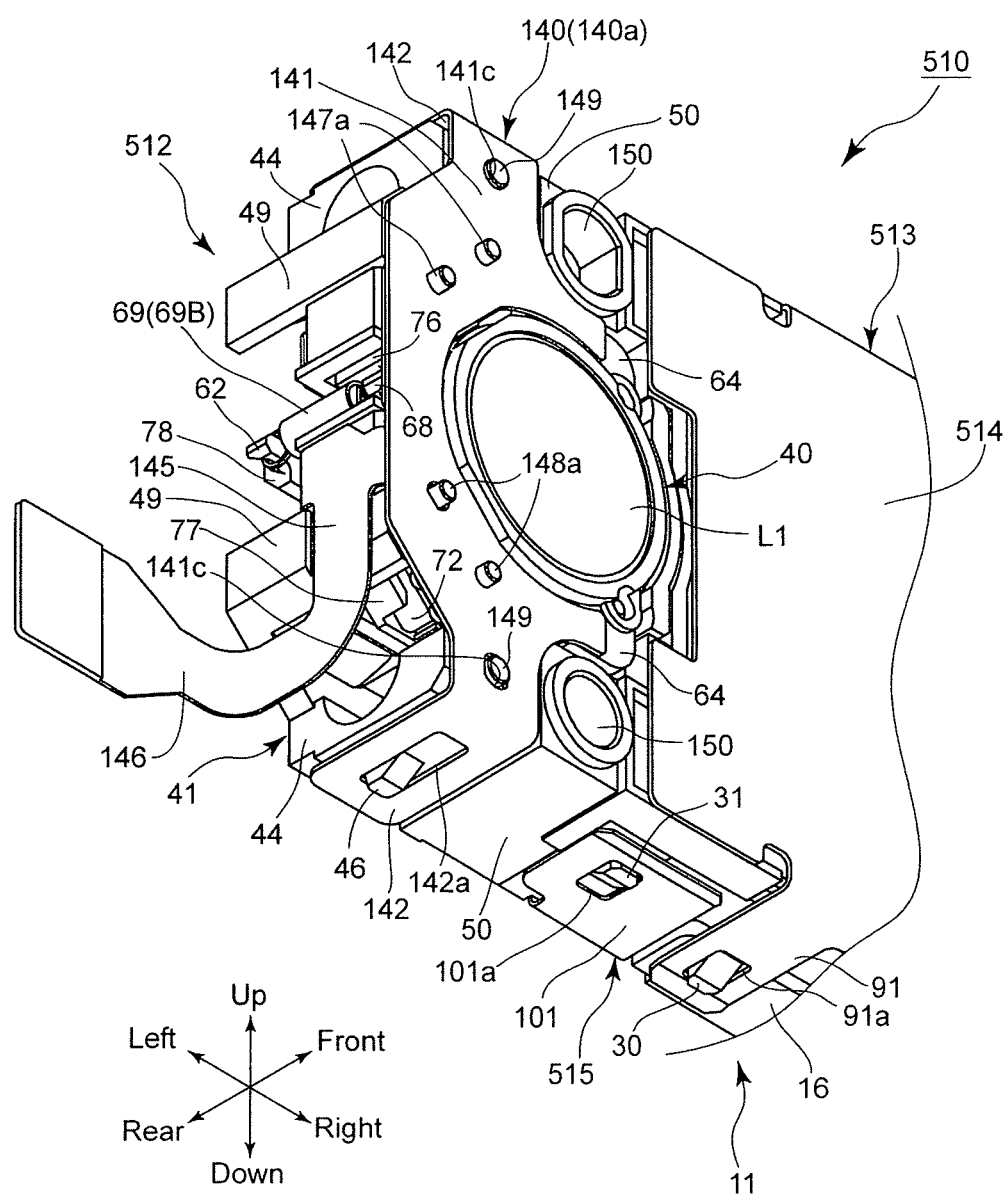
FIG. 18 is a front perspective view of a portion of another embodiment of the imaging unit in which all the elements of the anti-shake system are mounted to the first lens-group unit of the imaging unit.
Figure 19:
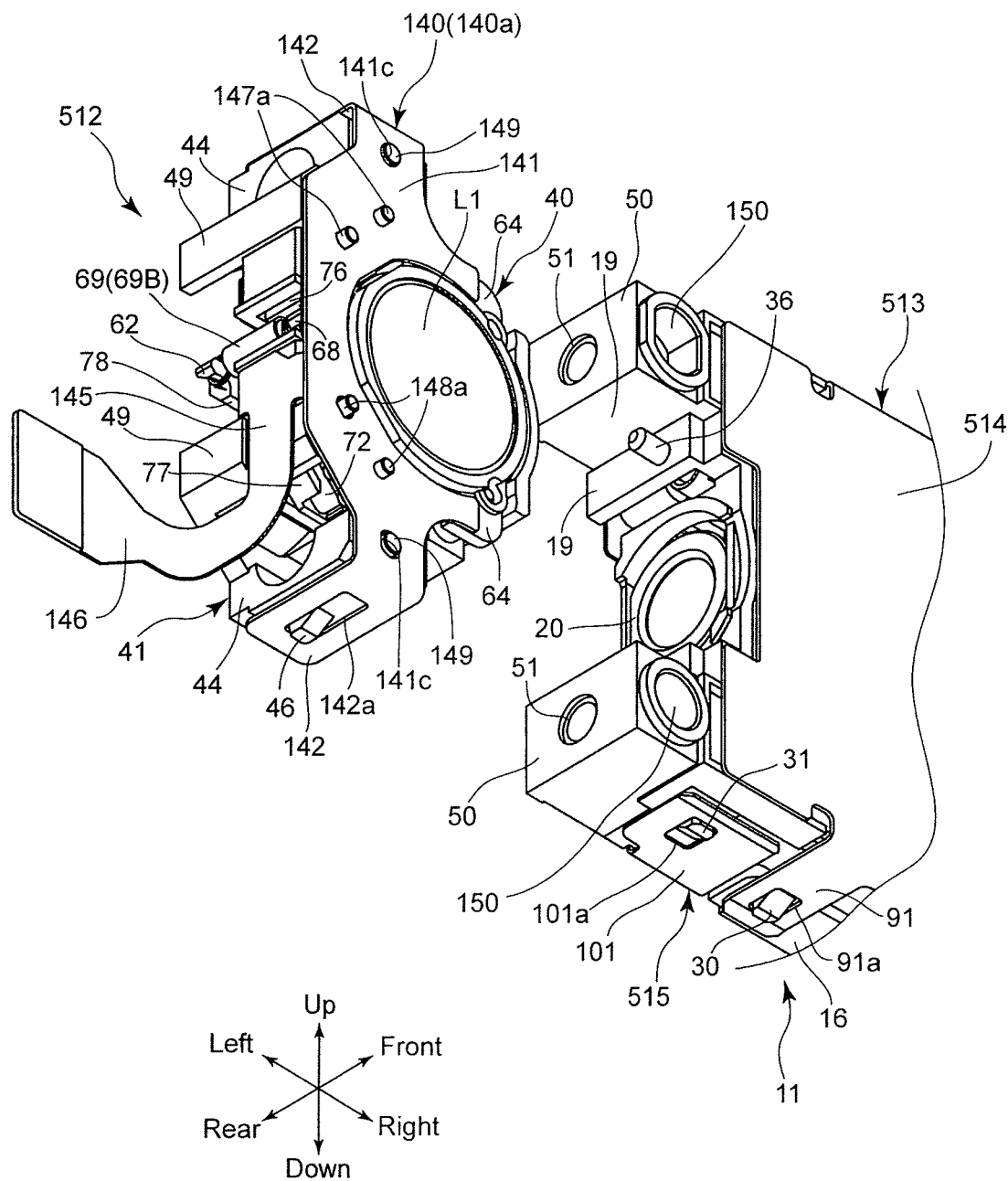
FIG. 19 is an exploded front perspective view of the portion of the embodiment of the imaging unit shown in FIG. 18, wherein the first lens-group unit is removed from a body module of the imaging unit.
Figure 20:
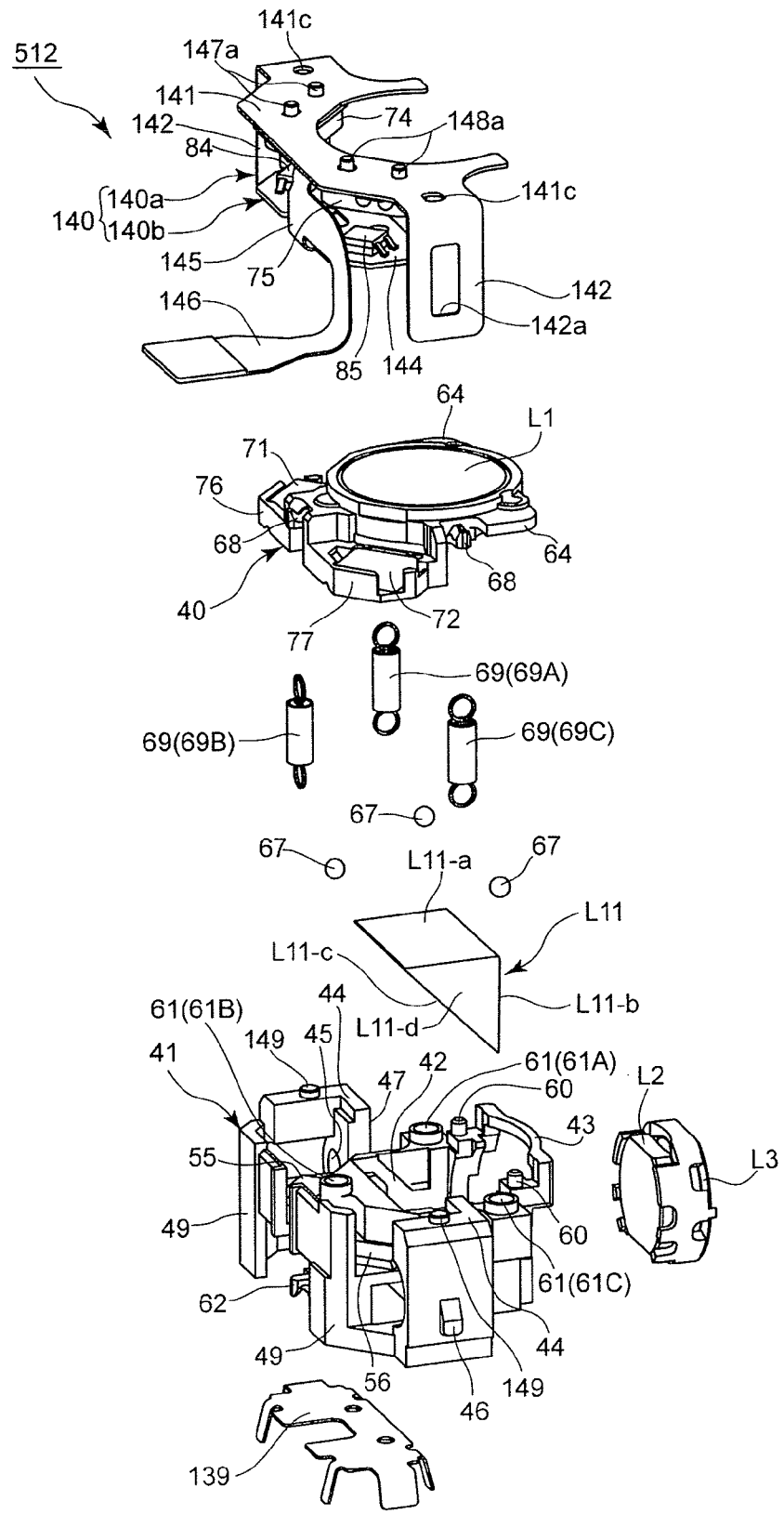
FIG. 20 is an exploded perspective view of the first lens-group unit shown in FIGS. 18 and 19.

FIGS. 15 through 17 show an imaging unit 410 as another embodiment of the imaging apparatus. The mechanism which makes the base frame 41 support the first lens frame 40 in a manner to allow the first lens frame 40 to move in the imaging unit 410 is different from that provided in each of the previous embodiments of the imaging apparatuses. The three guide balls 67 are held between the first lens frame 40 and the base frame 41 in each of the above described imaging units 10, 210 and 310, whereas a sliding sheet (resistance reducing member) 86 is held between the first lens frame 40 and the base frame 41 in the imaging unit 410. As shown in FIG. 17, a sliding projection 87 is projected from each of the three flanges 64 of the first lens frame 40 rearwardly, i.e., in a direction to approach the base frame 41 (note that only one sliding projection 87 appears in FIG. 17). The rear ends of the three sliding projections 87 are formed as surfaces lying in a plane orthogonal to the first optical axis O1. The base frame 41 is provided, at three positions respectively facing the flanges 64 of the first lens frame 40, with three support surfaces 88 which lie in a plane orthogonal to the first optical axis O1. Similar to the three ball support holes 61 (61A, 61B and 61C) in each of the previous embodiments of the imaging units, the three support surfaces 88 are formed at positions along the pair of short sides of the incident surface L11-a and the end long-side of the incident surface L11-a. The base frame 41 is provided, on two of the three support surfaces 88 which are formed along the pair of short sides of the incident surface L11-a, with two positioning projections 89, respectively. The sliding sheet 86 is a thin plate member which is substantially U-shaped in a front view, including three contact portions 86a and a frame-shaped connecting portion 86b which connects the three contact portions 86a. The sliding sheet 86 is made of a material having a low skin friction resistance (e.g., polytetrafluoroethylene). The sliding sheet 86 is provided with two positioning holes 86c, in which the two positioning projections 89 of the base frame 41 are engaged. In a state where the sliding sheet 86 is positioned by engagement between the positioning projections 89 and the positioning holes 86c, each contact portion 86a is held between the first lens frame 40 and the base 41 by the biasing force of the extension springs while being sandwiched from both sides in the forward/rearward direction between the sliding projection 87 of the associated flange 64 of the first lens frame 40 and the associated support surface 88 of the base frame 41.

In the imaging unit 410, the first lens frame 40 can be driven smoothly relative to the base frame 41 to reduce image shake by sandwiching the low slide-resistant sliding sheet 86 between the first lens frame 40 and the base 41, similar to the above described case using the three guide balls 67. Since the sliding sheet 86 consists of a single member including the three contact portions 86a and the frame-shaped connecting portion 86b that connects the three contact portions 86a, the number of elements is small, so that the sliding sheet 86 can be easily installed. The sliding sheet 86 is shaped such that none of the three contact portions 86a and the frame-shaped connecting portion 86b are positioned in the area along the exit long-side of the incident surface L11-a of the first prism L11 (i.e., along the exit surface L11-b), so that the optical path extending along the second optical axis O2 does not add constraints to the arrangement of the sliding sheet 86. In addition, the sliding sheet 86 is in the shape of a thin plate, which makes it easy to slim down the imaging unit 410. The structure in which the sliding sheet 86 is sandwiched between the three sliding projections 87 and the three support surfaces 88 also has the advantage of not requiring the first lens frame 40 or the base frame 41 to have a complicated shape.

FIGS. 18 through 21 show an imaging unit 510 as another embodiment of the imaging apparatus. The mechanism which supports the coils 74 and 75 and the magnetic sensors 84 and 85 in the imaging unit 510 is different from that provided in each of the previous embodiments of the imaging units. In each of the previous embodiments of the imaging apparatuses, the board module 13 is supported over the housing 16 of the body module 11 and the base frame 41 of the first lens-group unit 12. Whereas, in the imaging unit 510, a front cover 514 and a board module 513, which consists of a circuit board (not shown in FIGS. 18 and 19 because it is covered by the front cover 514; however, the image sensor IS and other components are mounted to this circuit board like the circuit board 73 of each of the previous embodiments of the imaging apparatuses) and other components, cover only the front of the housing 16 on the body module 11 side. In addition, a rear cover 515 that is partly shown in FIGS. 18 and 19 covers only the rear of the housing 16 on the body module 11, thus not having a portion corresponding to the support lug 104 of the rear cover 15 of each of the previous embodiments of the imaging apparatuses. Two fixing holes 150 for fixing the body module 11 during assembly or inspection are formed in the pair of flange support seats 50.

Figure 21:
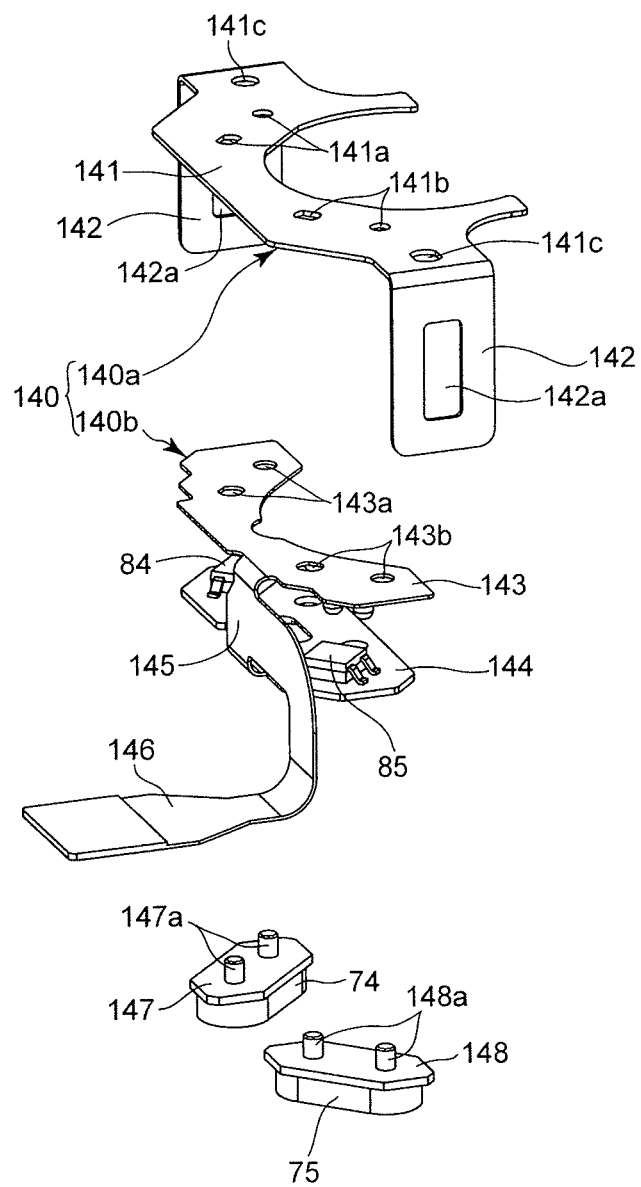
FIG. 21 is an exploded perspective view of a support board and associated elements that are shown in FIG. 20.

A support board 140, provided as a separate member from the board module 513, is mounted to a first lens-group unit 512. As shown in FIG. 21, the support board 140 is provided with a first board 140a and a second board 140b that are combined together to constitute the support board 140. The first board 140 is made of a metal plate and is provided with a front portion 141 and an upper and lower pair of engaging lugs 142. The front portion 141 is in the shape of a flat plate and covers the front of the magnet holding portions 76 and 77 of the first lens frame 40, and the upper and lower pair of engaging lugs 142 extend rearward (downward with respect to FIGS. 20 and 21) from the upper and lower edges of the front portion 141, respectively. The second board 140b is formed of a flexible board consisting of a coil support portion (first planar portion) 143, a sensor support portion (second planar portion) 144, a bridge portion (connecting portion) 145 and an extended portion 146. The coil support portion 143 is in the shape of a flat plate and fixed to the back of the front portion 141. The sensor support portion 144 is in the shape of a flat plate and faces the coil support portion 143 while being spaced therefrom. The bridge portion 145 connects the coil support portion 143 and the sensor support portion 144. The extended portion 146 is formed to extend from the bridge portion 145. The front portion 141 is provided with a pair of positioning holes 141a and a pair of positioning holes 141b, and the coil support portion 143 is provided with a pair of positioning holes 143a and a pair of positioning holes 143b which are formed to be substantially aligned with the pair of positioning holes 141a and pair of positioning holes 141b in the forward/rearward direction, respectively. A pair of positioning projections 147a which project from the coil support plate 147 that supports the coil 74 are engaged in the pair of positioning holes 141a and the pair of positioning holes 143a so that the coil 74 is fixedly supported by the coil support portion 143 thereon, and a pair of positioning projections 148a which project from the coil support plate 148 that supports the coil 75 are engaged in the pair of positioning holes 141b and the pair of positioning holes 143b so that the coil 75 is fixedly supported by the coil support portion 143 thereon. The magnetic sensors 84 and 85 are fixed to the sensor support portion 144 at positions facing the coils 74 and 75, respectively. The base frame 41 is provided on the front surfaces of the upper and lower pair of flanges 44 with a pair of positioning projections 149, respectively, and the first board 140a is provided in the front portion 141 with a pair of positioning holes 141c in which the pair of positioning projections 149 are engaged, respectively. The first board 140a is provided in the pair of engaging lugs 142 with a pair of engaging holes 142a in which the upper and lower engaging projections 46 of the base frame 41 are engaged, respectively. The support board 140 is supported by the base frame 41 at a predetermined position with respect to the base frame 41 by engagement of the pair of positioning projections 149 with the pair of positioning holes 141c with the front portion 141 of the first board 140a brought into contact with the front surfaces of the upper and lower pair of outer walls 49 of the pair of flanges 44 and engagement of the upper and lower engaging projections 46 of the base frame 41 with the pair of engaging holes 142a with the upper and lower pair of engaging lugs 142 brought into contact with the upper surface of the upper flange 44 and the lower surface of the lower flange 44, respectively. When supported by the base frame 41 in this manner, the front portion 141, the coil support portion 143 and the sensor support portion 144 of the support board 140 are each become a flat portion that is substantially orthogonal to the first optical axis O.

In a state where the support board 140 is fixed to the base frame 41, the coils 74 and 75 face the permanent magnets 71 and 72 on the first lens frame 40, respectively. In addition, the magnetic sensors 84 and 85 on the sensor support portion 144 are engaged in the sensor support portion 55 and 56, respectively, when the support board 140 is mounted to the base frame 41. In addition, a sensor retaining plate (retaining member) 139 (see FIG. 20), made of metal, which is provided as a separate member from the support board 140 is mounted to the base frame 41. Similar to the support lug 104 of the rear cover 15 of each of the previous embodiments of the imaging apparatuses, the sensor retaining plate 139 contacts the sensor support portion 144 from behind to stably hold the magnetic sensors 84 and 85 in the sensor support portions 55 and 56. It is desirable that the support board 140 (the first board 140a in particular) and the sensor retaining plate 139 be made of a nonmagnetic metal or a feeble magnetic metal so as to have no influence on the magnetic fields of the permanent magnets 71 and 72. The coils 74 and 75 and the magnetic sensors 84 and 85 are electrically connected to a control circuit (not shown) of the imaging unit 510 via the extended portion 146 of the second board 140b that is extended from the support board 140.

The coils 74 and 75 and the magnetic sensors 84 and 85 which are mounted to the first lens-group unit 512 via the support board 140 in the above described manner are fixed at positions corresponding to those on the first lens-group unit of each of the previous embodiments of the imaging apparatuses. Accordingly, the first lens frame 40 can be moved in a plane orthogonal to the first optical axis O1 with respect to the base frame 41 by controlling the passage of current through each of the coils 74 and 75. In the present embodiment of the imaging unit 510, since all of the elements of the anti-shake system for driving the first lens element L1 are integrated into the first lens-group unit 512, the anti-shake system can be inspected and adjusted with the first lens-group unit 512 in a stand-alone state, i.e., with the first lens-group unit 512 removed from the body module 11; hence, the present embodiment of the imaging unit 510 is superior in workability.

Although the present invention has been described based on the above illustrated embodiments, the present invention is not limited solely thereto; various modifications to the above illustrated embodiments are possible. For instance, although the coil 74 and the magnetic sensor 84 are positioned in front of and behind the permanent magnet 71, respectively, while the coil 75 and the magnetic sensor 85 are positioned in front of and behind the permanent magnet 72, respectively, in the above illustrated embodiment of the imaging apparatus, the coil 74 and the magnetic sensor 84 can be collectively positioned in an area in front of or behind the permanent magnet 71 while the coil 75 and the magnetic sensor 85 can be collectively positioned in an area in front of or behind the permanent magnet 72.

Additionally, in contrast to the moving-magnet electromagnetic actuator in the above illustrated embodiment of the imaging apparatus, the present invention can also be applied to an anti-shake system equipped with a moving-coil electromagnetic actuator in which the coils 74 and 75 are supported on the movable first lens frame 40 and the permanent magnets 71 and 72 are supported on the immovable base frame 41 as described above. In this case, the magnetic sensors 84 and 85 are supported by the movable first lens frame 40 side.

In either the moving-magnet anti-shake system or the moving-coil anti-shake system, when the elements of the anti-shake system are fixed to the first lens frame 40 and the base frame 41, it is desirable for the coils 74 and 75 and the magnetic sensors 84 and 85, which are required to electrically communicate with the control circuit, to be fixed to a board(s) such as the circuit board 73 or the support board 140 to be supported thereby and thereafter for this board(s) to be fixed to the first lens frame 40 or the base plate 41. Compared with this arrangement, the positioning of the permanent magnets 71 and 72 can be achieved by fixing the permanent magnets 71 and 72 directly to the first lens frame 40 or the base frame 41 with no such a board provided therebetween.

Additionally, the positional relationship between the coils 74 and 75 and the magnetic sensors 84 and 85 among the elements fixedly supported by the base frame 41 is such that the coils 74 and 75 are positioned on the front side (object side) and the magnetic sensors 84 and 85 are positioned on the rear side in a direction along the first optical axis O1 (i.e., the direction of the first optical axis O1) in the above illustrated embodiment of the imaging apparatus. However, the present invention is not limited to this particular positional relationship. For instance, it is also possible to reverse the positions of the coils 74 and 75 and the magnetic sensors 84 and 85 in the forward/rearward direction by the arrangement in which the coils 74 and 75 are supported by portions thereat corresponding to the support arms 82 and 83 of the circuit board 73 or the sensor support portions 143 and 144 of the support board 140 and in which the magnet sensors 84 and 85 are supported by portions thereat corresponding to the planar portion 79 of the circuit board 73 or the front portion 141 of the support board 140.

Although each of the permanent magnets 71 and 72 has a rectangular shape in a front view that is elongated in a direction along the associated magnetic boundary line Q1 or Q2 and each of the coils 74 and 75 has an elongated shape in a front view that is elongated in a direction along the associated long axis R1 or R2 in the above illustrated embodiment of the imaging apparatus, the present invention can also be applied to an anti-shake system having permanent magnets and coils which are different in shape from the permanent magnets 71 and 72 and the coils 74 and 75. Specifically, the permanent magnets of the anti-shake system can be replaced by permanent magnets each having a square shape in a front view.

Although the lens groups supported on the second optical axis O2 to be movable thereon are the second lens group G2 and the third lens groups G3 in the above illustrated embodiments of the imaging apparatuses, the present invention can also be applied to a type of imaging optical system which includes more than two movable lens groups (e.g., four or five movable lens groups) on the second optical axis O2.

Additionally, in the first lens group G1, it is possible to change the number of lenses installed in front of the incident surface L11-a of the first prism L11 on the first optical axis O1 and the number of lenses installed on the right-hand side of the exit surface L11-b of the first prism L11 on the second optical axis O2. For instance, the first lens element L1 in the above illustrated embodiments can be replaced by two or more than two front lens elements which are arranged in front of the first prism L11. In this case, the distances between the front lens elements installed in front of the first prism L11 are small, and accordingly, to prevent the aberration from deteriorating it is advisable to perform anti-shake control by moving all the plurality of front lens elements that are arranged in front of the first prism L11 in directions orthogonal to the first optical axis O1. Additionally, although the second lens element L2 and the third lens element L3 are arranged on the right-hand side of the first prism L11 in the above illustrated embodiments, the number of lens elements in the first lens group G1 which are arranged on the optical path extending from the exit surface L11-b of the first prism L11 toward the second lens group G2 can be one or more than two. Additionally, it is possible to modify the first lens group G1 so as not to include a lens element on the optical path extending from the exit surface L11-b of the first prism L11 toward the second lens group G2.

As mentioned above, the length of the optical path from the incident surface of the first lens element L1 to the image plane in the imaging unit 10 (210, 310, 410, 510) is constant at all times in the above described embodiments. In this type of imaging optical system, the first lens element L1 that is the closest to the object side is generally a negative lens. However, the lens (front lens element) for use in anti-shake control in the imaging apparatus according to the present invention can be a positive lens. Regardless of whether the power of the front lens element is negative or positive, any lens element can be adopted as the front lens element as long as it has a refractive power.

Additionally, although the imaging optical system of the above illustrated embodiment of the imaging unit 10 (210, 310, 410, 510) is a zoom lens (variable power optical system) which performs a zooming operation (power varying operation) by moving the second lens group G2 and the third lens group G3 along the second optical axis O2, the present invention is also applicable to an imaging apparatus which incorporates an imaging optical system having no power varying capability. For instance, it is possible to modify the imaging unit 10 (210, 310, 410, 510) such that the second lens group G2 and the third lens group G3 do not move for a zooming operation and that the second lens group G2 or the third lens group G3 moves solely for a focusing operation.

Although the incident surface L11-a of the first prism L11 in the above illustrated embodiments of the imaging apparatuses is in the shape of a laterally elongated rectangle, the present invention can also be applied to a type of imaging apparatus having a first prism (which corresponds to the first prism L11), the incident surface of which has a different shape such as a square or a trapezoid.

The bending angle (reflection angle) of an optical axis at each of the first prism L11 and the second prism L12 can be an angle other than 90 degrees.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging apparatus comprising:
a front lens group which constitutes part of an imaging optical system of said imaging apparatus and is provided at a fixed position with respect to an optical axis direction, wherein said front lens group includes at least one front lens element and a prism, in that order from an object side, and wherein light rays exiting from said front lens element along a first optical axis are reflected by said prism to travel along a second optical axis that is nonparallel to said first optical axis;
at least one rear lens group which constitutes another part of said imaging optical system and is provided closer to an image plane side than said front lens group;
a prism holder which supports at least said prism of said front lens group;
a movable frame which supports said front lens element of said front lens group and is supported by said prism holder to be movable along a plane orthogonal to said first optical axis; and
a driver which drives said movable frame along said plane, in response to vibrations applied to said photographing optical system, to reduce image shake on said image plane,
wherein said driver comprises a permanent magnet and a coil positioned in a magnetic field of said permanent magnet,
wherein one of said permanent magnet and said coil is a movable element which is fixed to said movable frame to move with said movable frame,
wherein the other of said permanent magnet and said coil is a fixed element, which does not move with said movable frame, and
wherein a position of said fixed element is determined by said prism holder;
wherein said movable frame comprises:
a lens holding portion which holds said front lens element; and
a movable element holding portion which holds said movable element and is formed closer to said image plane side than said lens holding portion in a direction of said first optical axis,
wherein said movable element, which is held by said movable element holding portion, is positioned within a range of thickness of said prism in said direction of said first optical axis.

2. The imaging apparatus according to claim 1, wherein said permanent magnet is said movable element and said coil is said fixed element,
wherein said imaging apparatus further includes a detecting member which detects a position of said movable member that is driven by said driver, and
wherein said prism holder includes a first positioning portion and a second positioning portion which position said coil and said detecting member at different positions in said direction of said first optical axis, respectively.

3. The imaging apparatus according to claim 2, wherein said first positioning portion and said second positioning portion of said prism holder are positioned to be opposed to each other in said direction of said first optical axis with said movable element positioned therebetween.

4. The imaging apparatus according to claim 2, wherein one of said coil and said detecting member that is positioned on said image plane side in said direction of said first optical axis is positioned within a range of thickness of said prism in said direction of said first optical axis.

5. The imaging apparatus according to claim 4, wherein said first positioning portion and said second positioning portion are positioned on said object side and said image plane side, respectively, in said direction of said first optical axis.

6. The imaging apparatus according to claim 2, wherein said coil and said detecting member are supported by a board thereon which is fixed to said prism holder.

7. The imaging apparatus according to claim 6, wherein said board comprises:
   a first planar portion and a second planar portion which are opposed to each other in said direction of said first optical axis and are substantially orthogonal to said first optical axis; and
   a connecting portion which extends in said direction of the first optical axis and connects said first planar portion and said second planar portion,
   wherein said coil and said detecting member are supported by opposed surfaces of said first planar portion and said second planar portion thereon which are opposed to each other in said direction of said first optical axis, respectively, and
   wherein said movable element is positioned between said opposed surfaces of said first planar portion and said second planar portion.

8. The imaging apparatus according to claim 7, wherein said first planar portion that supports said coil is in contact with and supported by said prism holder, and
   wherein said prism holder is provided with a recess into which said detecting member is fitted and supported thereby.

9. The imaging apparatus according to claim 8, further comprising a retaining member which is provided as a separate member from said board and is fixed to said prism holder to press said second planar portion from an outer side with said detecting member fitted into said recess and supported thereby.

10. The imaging apparatus according to claim 6, further comprising a housing which supports said rear lens group thereinside,
    wherein said prism holder is detachably attached to said housing, and
    wherein said board is attached over both said housing and said prism holder.

11. The imaging apparatus according to claim 6, further comprising a housing which supports said rear lens group thereinside,
    wherein said board is attached to said prism holder without being supported by said housing, and
    wherein a unit which includes said prism holder and said board is detachably attached to said housing.

12. The imaging apparatus according to claim 1, further comprising a biaser which biases said movable frame toward said image plane side in said direction of said first optical axis to make said movable frame be supported by said prism holder.

13. The imaging apparatus according to claim 1, further comprising a resistance reducing member which is sandwiched between said movable frame and said prism holder to reduce frictional resistance between said movable frame and said prism holder when said movable frame moves relative to said prism holder.

14. The imaging apparatus according to claim 1, wherein said permanent magnet comprises two permanent magnets which are positioned so that a magnetic pole boundary line of said first magnet and a magnetic pole boundary line of said second magnet are orthogonal to each other in a plane orthogonal to said first optical axis, and
    wherein said coil comprises two coils which are positioned to be opposed to said two permanent magnets in said direction of said first optical axis, respectively.

15. An imaging apparatus comprising:
    a front lens group which constitutes part of an imaging optical system of said imaging apparatus and is provided at a fixed position with respect to an optical axis direction, wherein said front lens group includes at least one front lens element and a prism, in that order from an object side, and wherein light rays exiting from said front lens element along a first optical axis are reflected by said prism to travel along a second optical axis that is nonparallel to said first optical axis;
    at least one rear lens group which constitutes another part of said imaging optical system and is provided closer to an image plane side than said front lens group;
    a prism holder which supports at least said prism of said front lens group;
    a movable frame which supports said front lens element of said front lens group and is supported by said prism holder to be movable along a plane orthogonal to said first optical axis; and
    a driver which drives said movable frame along said plane, in response to vibrations applied to said photographing optical system, to reduce image shake on said image plane,
    wherein said driver comprises a permanent magnet and a coil positioned in a magnetic field of said permanent magnet,
    wherein one of said permanent magnet and said coil is a movable element which is fixed to said movable frame to move with said movable frame,
    wherein the other of said permanent magnet and said coil is a fixed element, which does not move with said movable frame,
    wherein a position of said fixed element is determined by said prism holder;
    wherein said permanent magnet is said movable element and said coil is said fixed element,
    wherein said imaging apparatus further includes a detecting member which detects a position of said movable member that is driven by said driver,
    wherein said prism holder includes a first positioning portion and a second positioning portion which position said coil and said detecting member at different positions in said direction of said first optical axis, respectively; and
    wherein one of said coil and said detecting member that is positioned on said image plane side in said direction of said first optical axis is positioned within a range of thickness of said prism in said direction of said first optical axis.

16. The imaging apparatus according to claim 15, wherein said first positioning portion and said second positioning portion are positioned on said object side and said image plane side, respectively, in said direction of said first optical axis.

17. An imaging apparatus comprising:
a front lens group which constitutes part of an imaging optical system of said imaging apparatus and is provided at a fixed position with respect to an optical axis direction, wherein said front lens group includes at least one front lens element and a prism, in that order from an object side, and wherein light rays exiting from said front lens element along a first optical axis are reflected by said prism to travel along a second optical axis that is nonparallel to said first optical axis;
at least one rear lens group which constitutes another part of said imaging optical system and is provided closer to an image plane side than said front lens group;
a prism holder which supports at least said prism of said front lens group;
a movable frame which supports said front lens element of said front lens group and is supported by said prism holder to be movable along a plane orthogonal to said first optical axis; and
a driver which drives said movable frame along said plane, in response to vibrations applied to said photographing optical system, to reduce image shake on said image plane,
wherein said driver comprises a permanent magnet and a coil positioned in a magnetic field of said permanent magnet,
wherein one of said permanent magnet and said coil is a movable element which is fixed to said movable frame to move with said movable frame,
wherein the other of said permanent magnet and said coil is a fixed element, which does not move with said movable frame,
wherein a position of said fixed element is determined by said prism holder;
wherein said permanent magnet is said movable element and said coil is said fixed element,
wherein said imaging apparatus further includes a detecting member which detects a position of said movable member that is driven by said driver,
wherein said prism holder includes a first positioning portion and a second positioning portion which position said coil and said detecting member at different positions in said direction of said first optical axis, respectively,
wherein said coil and said detecting member are supported by a board thereon which is fixed to said prism holder, and
wherein said board comprises:
a first planar portion and a second planar portion which are opposed to each other in said direction of said first optical axis and are substantially orthogonal to said first optical axis; and
a connecting portion which extends in said direction of the first optical axis and connects said first planar portion and said second planar portion,
wherein said coil and said detecting member are supported by opposed surfaces of said first planar portion and said second planar portion thereon which are opposed to each other in said direction of said first optical axis, respectively, and
wherein said movable element is positioned between said opposed surfaces of said first planar portion and said second planar portion.

18. The imaging apparatus according to claim 17, wherein said first planar portion that supports said coil is in contact with and supported by said prism holder, and wherein said prism holder is provided with a recess into which said detecting member is fitted and supported thereby.

19. The imaging apparatus according to claim 18, further comprising a retaining member which is provided as a separate member from said board and is fixed to said prism holder to press said second planar portion from an outer side with said detecting member fitted into said recess and supported thereby.

20. An imaging apparatus comprising:
a front lens group which constitutes part of an imaging optical system of said imaging apparatus and is provided at a fixed position with respect to an optical axis direction, wherein said front lens group includes at least one front lens element and a prism, in that order from an object side, and wherein light rays exiting from said front lens element along a first optical axis are reflected by said prism to travel along a second optical axis that is nonparallel to said first optical axis;
at least one rear lens group which constitutes another part of said imaging optical system and is provided closer to an image plane side than said front lens group;
a prism holder which supports at least said prism of said front lens group;
a movable frame which supports said front lens element of said front lens group and is supported by said prism holder to be movable along a plane orthogonal to said first optical axis; and
a driver which drives said movable frame along said plane, in response to vibrations applied to said photographing optical system, to reduce image shake on said image plane,
wherein said driver comprises a permanent magnet and a coil positioned in a magnetic field of said permanent magnet,
wherein one of said permanent magnet and said coil is a movable element which is fixed to said movable frame to move with said movable frame,
wherein the other of said permanent magnet and said coil is a fixed element, which does not move with said movable frame, and
wherein a position of said fixed element is determined by said prism holder; wherein said permanent magnet is said movable element and said coil is said fixed element,
wherein said imaging apparatus further includes a detecting member which detects a position of said movable member that is driven by said driver,
wherein said prism holder includes a first positioning portion and a second positioning portion which position said coil and said detecting member at different positions in said direction of said first optical axis, respectively,
wherein said coil and said detecting member are supported by a board thereon which is fixed to said prism holder, and
further comprising a housing which supports said rear lens group thereinside,
wherein said prism holder is detachably attached to said housing, and
wherein said board is attached over both said housing and said prism holder.

21. An imaging apparatus comprising:
a front lens group which constitutes part of an imaging optical system of said imaging apparatus and is provided at a fixed position with respect to an optical axis direction, wherein said front lens group includes at least one front lens element and a prism, in that order from an object side, and wherein light rays exiting from said front lens element along a first optical axis are reflected by said prism to travel along a second optical axis that is nonparallel to said first optical axis;

at least one rear lens group which constitutes another part of said imaging optical system and is provided closer to an image plane side than said front lens group;

a prism holder which supports at least said prism of said front lens group;

a movable frame which supports said front lens element of said front lens group and is supported by said prism holder to be movable along a plane orthogonal to said first optical axis; and a driver which drives said movable frame along said plane, in response to vibrations applied to said photographing optical system, to reduce image shake on said image plane, wherein said driver comprises a permanent magnet and a coil positioned in a magnetic field of said permanent magnet, wherein one of said permanent magnet and said coil is a movable element which is fixed to said movable frame to move with said movable frame, wherein the other of said permanent magnet and said coil is a fixed element, which does not move with said movable frame, wherein a position of said fixed element is determined by said prism holder;

wherein said permanent magnet is said movable element and said coil is said fixed element, wherein said imaging apparatus further includes a detecting member which detects a position of said movable member that is driven by said driver, wherein said prism holder includes a first positioning portion and a second positioning portion which position said coil and said detecting member at different positions in said direction of said first optical axis, respectively, wherein said coil and said detecting member are supported by a board thereon which is fixed to said prism holder, and further comprising a housing which supports said rear lens group thereinside, wherein said board is attached to said prism holder without being supported by said housing, and wherein a unit which includes said prism holder and said board is detachably attached to said housing.

* * * * *